US009533703B2

(12) United States Patent
Shimizu et al.

(10) Patent No.: US 9,533,703 B2
(45) Date of Patent: Jan. 3, 2017

(54) VEHICLE STEERING DEVICE

(71) Applicant: HONDA MOTOR CO., LTD., Minato-Ku, Tokyo (JP)

(72) Inventors: Yasuo Shimizu, Wako (JP); Manabu Ikegaya, Wako (JP); Atsuhiko Yoneda, Wako (JP); Takashi Miyoshi, Wako (JP); Yoshihiro Oniwa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 14/655,611

(22) PCT Filed: Dec. 26, 2013

(86) PCT No.: PCT/JP2013/085002
§ 371 (c)(1),
(2) Date: Jun. 25, 2015

(87) PCT Pub. No.: WO2014/104253
PCT Pub. Date: Jul. 3, 2014

(65) Prior Publication Data
US 2015/0360715 A1 Dec. 17, 2015

(30) Foreign Application Priority Data
Dec. 28, 2012 (JP) .................................. 2012-287173

(51) Int. Cl.
*A01B 69/00* (2006.01)
*B62D 5/04* (2006.01)
(Continued)

(52) U.S. Cl.
CPC ............. *B62D 5/0487* (2013.01); *B62D 5/001* (2013.01); *B62D 5/003* (2013.01); *B62D 5/046* (2013.01);
(Continued)

(58) Field of Classification Search
CPC ......... B62D 5/003; B62D 6/00; B62D 5/0463; B62D 5/0487; B62D 5/0481; G06F 19/00
(Continued)

(56) References Cited

U.S. PATENT DOCUMENTS

2005/0072621 A1 4/2005 Hara et al.
2005/0159866 A1* 7/2005 Takeuchi ............... B62D 5/003
701/41
(Continued)

FOREIGN PATENT DOCUMENTS

CN 102320325 A 1/2012
CN 102407878 A 4/2012
(Continued)

OTHER PUBLICATIONS

Office Action of corresponding Japanese Patent Application 2014-554573 dated Feb. 9, 2016.
(Continued)

*Primary Examiner* — Gertrude Arthur Jeanglaud
(74) *Attorney, Agent, or Firm* — Carrier Blackman & Associates, P.C.; Joseph P. Carrier; William D. Blackman

(57) ABSTRACT

The steering device includes first and second motors for steering which have common electric characteristics; first and second current sensors detecting first and second current values in the first and second motor, respectively; and abnormality diagnosis units. The abnormality diagnosis units make an abnormality diagnosis indicating that the steering device is abnormal when difference between the first and second current values exceeds a predetermined threshold value. When some abnormality occurs in the current detecting units for detecting the magnitudes of a current flowing through the steering motor, an abnormality diagnosis is rapidly made by comparing the difference with the predetermined value.

5 Claims, 10 Drawing Sheets

(51) Int. Cl.
   *F16D 41/06* (2006.01)
   *F16D 41/08* (2006.01)
   *B62D 5/00* (2006.01)

(52) U.S. Cl.
   CPC ............ *B62D 5/0484* (2013.01); *F16D 41/06* (2013.01); *F16D 41/08* (2013.01)

(58) Field of Classification Search
   USPC .................... 701/29.2, 31.4, 41, 42; 180/443
   See application file for complete search history.

(56) References Cited

U.S. PATENT DOCUMENTS

| 2006/0043917 A1 | 3/2006 | Kifuku et al. |
| 2012/0072077 A1 | 3/2012 | Park et al. |

FOREIGN PATENT DOCUMENTS

| DE | 102005005020 A1 | 3/2006 |
| JP | 2002-225733 A | 8/2002 |
| JP | 2003-165460 A | 6/2003 |
| JP | 2004345413 A | 12/2004 |
| JP | 2005-008073 A | 1/2005 |
| JP | 2005-082057 A | 3/2005 |
| JP | 2008-221916 A | 9/2008 |
| JP | 2008-273419 A | 11/2008 |
| JP | 2010-076692 A | 4/2010 |
| JP | 2010-149678 A | 7/2010 |
| JP | 2010-195251 A | 9/2010 |

OTHER PUBLICATIONS

Office Action corresponding to Chinese Patent Application 201380067795.1 issued Jun. 3, 2016.

* cited by examiner

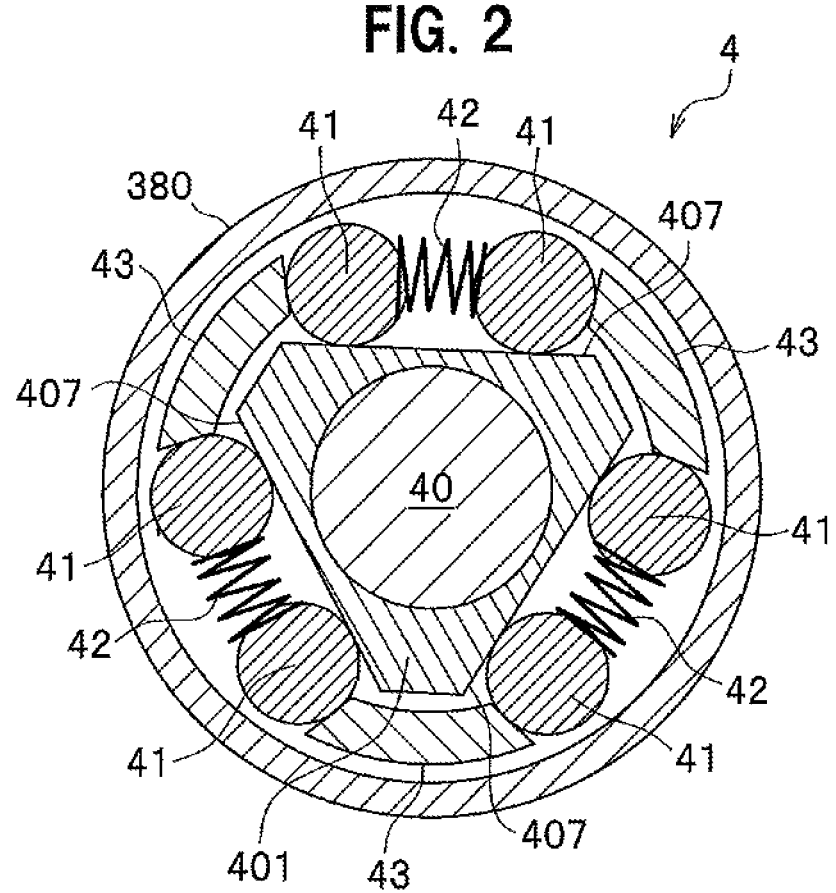

VEHICLE STEERING DEVICE

TECHNICAL FIELD

The present invention relates to a vehicle steering device used when a vehicle changes its traveling direction to a desired direction.

BACKGROUND ART

In recent vehicles, there are vehicles having a steering device of a by-wire (By Wire) system in which driver's steering intension is transmitted to steered wheels through conversion into an electric signal through wires. In the steering device of the by-wire system, a steering direction and a steering quantity by the driver are converted into electric signals which are supplied to a steering device including a steering motor. In response to this, the steering device operates to turn the steered wheels in accordance with the steering intention of the driver by driving the steering motor in accordance with an electric signal (for example, see Patent document 1).

According to the steering device of the by-wire system, for example, during traveling on a road surface having undulations such as a rut, though one of a pair of the steed wheels arranged in a vehicle width direction falls into a part of the road surface having the undulations, this can suppress occurrence of uncontrollable state of the steering wheel by generation of yaw-moment in the vehicle body. As a result, this can reduce an operation load of the steering wheel on the driver.

PRIOR ART

Patent Document 1: JP 2003-165460 A;
Patent Document 2: JP 2008-221916 A.

SUMMARY OF INVENTION

Problem to be Solved by Invention

In the steering device of the by-wire type disclosed in Patent Document 1, it is assumed that an error signal is generated in the current sensor which detects a magnitude of a current flowing through a steering motor because the motor falls into some error state. In this state, when it is tried to perform an abnormality diagnosis for the steering motor and the current sensor by making an operation process for the error signal, there is a problem in that some waiting time is necessary up to determination of the abnormality diagnosis because the operation process needs a predetermined time period.

Further, in the steering device of the by-wire type disclosed in Patent Document 2, the steering device includes a main steering motor and a sub-steering motor. A steering current command value is calculated from a signal from a steering command angle obtained from the steering wheel angle sensor and a vehicle speed sensor through operation and a signal from the motor angle sensor. An abnormality diagnosis of the steering device is performed on the basis of whether signs of these command values are different from each other and whether an absolute value of a difference between them is equal to or greater than an error determination threshold.

In the by-wire type of steering device disclosed in Patent Document 2, there is a problem in that there must be some waiting time to make a decision like Patent Document 1 because it takes a given time period to calculate the steering current command value from the steering command angle and a motor angle sensor signal.

Further, in the by-wire type of steering device according to Patent Document 2, the abnormality diagnosis for the steering motor is made on the basis of a difference between a first steering current command value obtained from a first steering command angle and a first steering motor angle sensor and a second steering current command value obtained from the second steering command angle and a second steering motor angle sensor without using a magnitude of the current flowing through the steering motor. Accordingly, for example, when the steering motor falls into some error state, the diagnosis of the occurrence of the error is made in response to the error state of the steering motor. As a result, it is fear that a behavior of the vehicle falls into an error state while the diagnosis of the occurrence of the error is made.

The present invention is provided to solve the above-described problem, for example, even in a case where the steering motor enters some error state, so that an error signal is generated at a current detecting unit for detecting a magnitude of a current flowing through the steering motor, it is an aim to rapidly perform the diagnosis of the occurrence of the error, while a behavior of the vehicle is kept in a normal state.

Means for Solving Problem

The invention (1) is mainly characterized including first and second motors for steering, the motors being set to have a common electric characteristic and being connected each other through a steering force transmission mechanism, a steering device for steering steered wheels in accordance with an operation to a steering member, a first current detecting unit for detecting a first current value flowing through the first motor, a second current detecting unit for detecting a second current value flowing through the second motor, and an abnormality diagnosis unit for making determination that the steering device is abnormal for the diagnosis when the deviation of the first and second currents value respectively detected by the first and second current detecting units exceeds a predetermined threshold value.

In the invention (1), the abnormality diagnosis unit makes a determination in the diagnosis that the steering device is abnormal, when the deviation of the first and second current value exceeding a predetermined threshold value.

When a predetermined steering operation for driven wheels is normally performed, currents, having balanced current magnitudes, flow through the first and second motors, respectively. This is because the first and second motors are set to have electric characteristics commonly and are connected to each other through a steering force transmitting mechanism.

Accordingly, the abnormality diagnosis unit can make the abnormality diagnosis of the steering device (first or second current sensor) without any complicated operation process or a waiting period for a diagnosis process.

Accordingly, in the invention (1), even in a case where an error signal is generated at the first and second current detecting units due to a trouble of, for example, the steering motor, etc. it can be made rapidly to make the diagnosis for detecting and error.

Further, the abnormality diagnosis unit makes the diagnosis for detecting occurrence of the error on the basis of the first and second current values in which the currents flowing through the first and second motors for steering are directly detected by the first and second current detecting units, respectively. Accordingly, the diagnosis for determining an occurrence of the error can be provided before the troubled motor begins to rotate abnormally during the abnormality diagnosis. This previously suppresses an abnormal behavior of the vehicle may occur due to an abnormal rotation of the troubled motor.

This is described hereinafter with a troubled case being exemplified in which, for example, if three-phase motors are used for steering as the first and second motors, and one of three phases of the motor is shorted, and a large current flows. In this troubled case, the abnormality diagnosis can be made instantaneously as compared with a current detection signal of a motor in normal state because the current detection signal of the abnormal motor largely exceeds the threshold value. Further, the first and second motors are set to have electrical characteristic which are common therebetween, so that a magnitude of an output of the normal motor is similar to that of the abnormal motor. This does not result in a situation in which the steered wheels are turned to an abnormal state via a magnitude of the output of the abnormal motor overcomes a magnitude of the output of the normal motor.

Further, even if another error (stop) occurs on one of the first and second motors, the steering function can be maintained by the other motor. In addition, if it is assumed that another error (reverse rotation) occurs on one of the first and second motors, the other motor cancels out the error (reverse rotation). As a result, it can be expected to have such an effect to maintain the steering function to a feasible extent.

In addition, according to the invention (1), because the first and second motors for steering, which are set to have a common electrical characteristic, are connected with each other through the steering force transmitting mechanism, an output characteristic of each motor can be reduced to a lower than the case where a single motor drives the steering device. Accordingly, for example, operation is possible with power supply from a well-known battery of 12 volts, so that a new battery of 24 volt or a booster circuit for 48 volts is not necessary. As a result, a size of each motor can be small, so that a degree of freedom in layout can be secured.

Further the invention (2) is characterized in that the vehicle steering device according to (1) further comprises:
a reaction force application device, including a third motor, configured to apply a reaction force in response to operation of the steering member;
a first control unit configured to mainly perform drive control of the first motor;
a second control unit configured to mainly perform drive control of the second motor;
a third control unit configured to mainly perform drive control of the third motor, wherein
the first to third control units include the abnormality diagnosis unit and include functions executing common processes whose at least parts are the same; wherein
the abnormality diagnosis unit compares three processing results obtained by executing the common processes by the first to third control units, respectively, and wherein
on the basis of the comparison result, when more than one of the three processing results belong to a predetermined allowable range, the abnormality diagnosis unit makes a diagnosis to indicate that the control units corresponding to the more than one of the processing results are normal and a diagnosis to indicate that the control unit corresponding to the processing result outside the processing results of the more than one of the processing results is abnormal.

In the invention (2), an abnormality diagnosis unit performs the abnormality diagnosis according to the principle of a majority rule. More specifically, the abnormality diagnosis unit compares three process result obtained by performing the common process with the first to third control devices, and when more than one process results are in a predetermined allowable range, a diagnosis result is provided to indicate that the control devices are normal, which correspond to the more than one process results and another diagnosis result is also provided to indicate that the control device having a process result other than the more than one process result in the predetermined allowable range is abnormal.

Accordingly to the invention (2), the abnormality diagnosis for the first to third control units can be made appropriately at an appropriate timing.

Further, the control device whose diagnosis result indicates "normal" is allowed to have a configuration to continue the control operation, which contributes to maintain the steering function to a feasible extent.

Further the invention (3) is characterized in that the vehicle steering device according to (2) further comprises:
a connecting device, disposed between the steering device and the reaction force application device, and configured to switch mechanical connection between a first rotation shaft on a side of the steering device and a second ration shaft on a side of a reaction force applying device to either of a disconnection state or a connection state,
wherein the connecting device comprises:
a hollow cylindrical member provided at either one of the first rotation shaft or the second rotation shaft; a cam member, disposed at the other, different from the one, of the first and second rotation shafts, which can be housed in the hollow cylindrical member; a plurality of pairs of rollers in a gap between the hollow cylindrical member and the cam member;
a plurality of spring members, which are disposed between plurality of pairs of the rollers, respectively, each of which applies a biasing force to the pair of the rollers in such a direction that the rollers are separated;
a switching claw unit provided insertably and removably to and from gaps between the hollow cylindrical member and the cam member;
a switching device switching the switching claw unit to either of a disconnection state in which the switching claw units are inserted into the gaps or a connecting state in which the switching claw units are removed from the gaps; wherein,
when the switching device of the connecting device switches the switching claw unit from the disconnection state to the connecting state, a plurality of the spring members are released from the biasing force by the switching claw unit, which engages a plurality of pairs of rollers with the gaps between the hollow cylindrical member and the cam member in a cuneiform manner, which mechanically connects the first and second rotation shafts to mechanically connect the steering member and the steered wheel.

In the invention (3), when the switching device of the connecting device switches the switching claw unit from the disconnection state to the connecting state in response to an abnormality diagnosis, a plurality of the spring members are released from the biasing force by the switching claw unit, which engages a plurality of pairs of rollers with the gaps between the hollow cylindrical member and the cam member in a cuneiform manner, which mechanically connects the first and second rotation shafts to mechanically connect the steering member and the steered wheel.

According to the invention (3), when the abnormality diagnosis unit performs the abnormality diagnosis, it is possible to mechanically connect the steering member to the steered wheel instantaneously by the switching device in the connecting device, i.e., pulling out in an axial direction of the first or second rotation shaft the claw unit which cause pairs of rollers to be loosely fitted to mechanically connect the steering member to the steered wheel instantaneously. In addition this mechanical connection does not depend on the operation position of the steering member, so that the steering function can be surely maintained instantaneously at any operation position.

The invention (4) is characterized in that the vehicle steering device according to (3), wherein the first to third control devices switch the switching claw unit from the disconnection state to the connection state by performing control to cut off the power supply to the connecting device in response to the abnormality diagnosis by the abnormality diagnosis unit.

In the invention (4), the first to third control devices switch the switching claw unit from the disconnection state to the connection state by performing control to cut off the power supply to the connecting device in response to the abnormality diagnosis by the abnormality diagnosis unit.

According to the invention (4), a preferable embodiment is provided from a viewpoint of fail-safe, i.e. surely maintaining the steering function can be provided from the embodiment in which, though a diagnosis indicating one of the first to third control units is abnormal, other two control units operates complementally.

Further, the invention (5) is characterized in that the vehicle steering device according to any one of (2) to (4), the first to third control devices perform driving at least one of the first motor, the second motor, and the third motor when the first to third control devices cause the switching claw unit to switch from the disconnection states to the connecting states.

At a start-up of the vehicle steering device according to the present invention, the switching claw unit of the connecting device is in a connecting state. More specifically, when during parking of a vehicle of which switching claw unit of the connecting device is in a connecting state, in a case where an excessive load torque is applied to a connecting part of the connecting device by stationary-steering the steering wheel 1, a fixed state occurs in which abutting portions occur. As a result, if it is tried to operate the switching device of the connecting device, there may be a possibility that the connecting device cannot be switched from the connecting state to a disconnecting state because the switching claw unit cannot be inserted into gaps inside the circular cylindrical member between the circular cylindrical member and the cam member.

Accordingly, the invention recited in (5), when the switching claw unit in the connecting state is switched to the disconnection state, the first to third control units perform control to drive more than one of the first to third motors.

According to the invention (5), though connecting parts of the connecting device are in a fixed state, it is possible to rapidly release the connecting part. As a result, it can be provided to surely display the original steering function.

Further, the invention (6) is characterized in that the vehicle steering device according to any one of (1) to (5), the first to third control devices further include a storage storing association information describing types of appropriate steering function modes, the types being associated with a plurality of abnormal places, respectively, and wherein the first to third control devices perform control to set one of the appropriate steering function modes associated with the abnormal place regarding the abnormality diagnosis unit among the first steering function mode (active variable gear ratio steering; active VGS), the second steering function mode (variable gear ratio steering: VGS), a third steering function mode (electric power steering: EPS), and a fourth steering function mode (manual steering), with reference to the abnormal place regarding the abnormality diagnosis by the abnormality diagnosis unit and the association information.

In the invention (6), with reference to an abnormal place regarding the abnormality diagnosis by the abnormality diagnosis unit and the association information, the first to third control devices perform control to set an appropriate steering function mode corresponding places to any one of the, to any one of the first steering function mode (active variable gear ratio steering; active VGS), the second steering function mode (variable gear ratio steering: VGS), a third steering function mode (electric power steering: EPS), and a fourth steering function mode (manual steering, with reference to the abnormal place regarding the abnormality diagnosis by the abnormality diagnosis unit and the association information.

According to the invention (6), shifting steps to the manual steering which is a final means when abnormality occurs in the steering system to re-structure the steering system in respective steps using the remaining functions and an appropriate steering function mode is set to perform the steering control, so that a frequency of switching to the manual steering, which is a final means, is suppressed, so that the steering function can be improved in quality.

Advantageous Effect of Invention

According to the vehicle steering device of the present invention, for example, the motor for steering enter some abnormal state and an abnormality signal is developed in the current detecting unit for detecting a magnitude of a current flowing through the motor for steering, the abnormality diagnosis can be rapidly made with keeping the vehicle's behavior in the normal state.

BRIEF DESCRIPTION OF DRAWINGS

FIG. 2 is a cross section, taken along A-A line, showing a disconnection state of the connecting device.

FIG. 10 is a flowchart showing a flow of process of a subroutine of Active VGS3 (Active Variable Gear ratio Steering 3).

MODES FOR CARRYING OUT INVENTION

Hereinafter, a vehicle steering device according to embodiments of the present invention is described with reference to drawings.

Figure 1A:
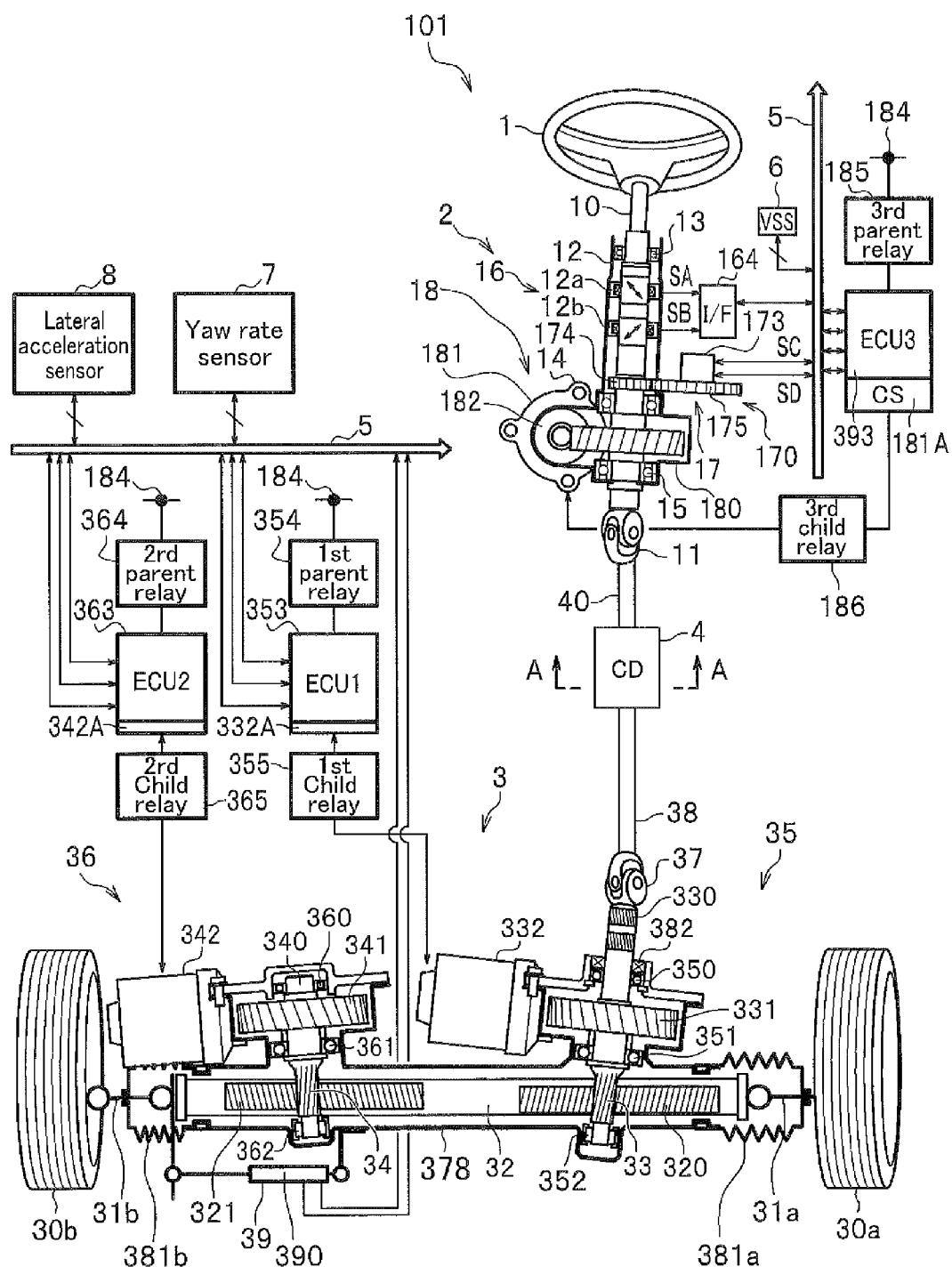
FIG. 1A is a block diagram showing a general structure of a vehicle steering device according to embodiments of the present invention.
Figure 1B:
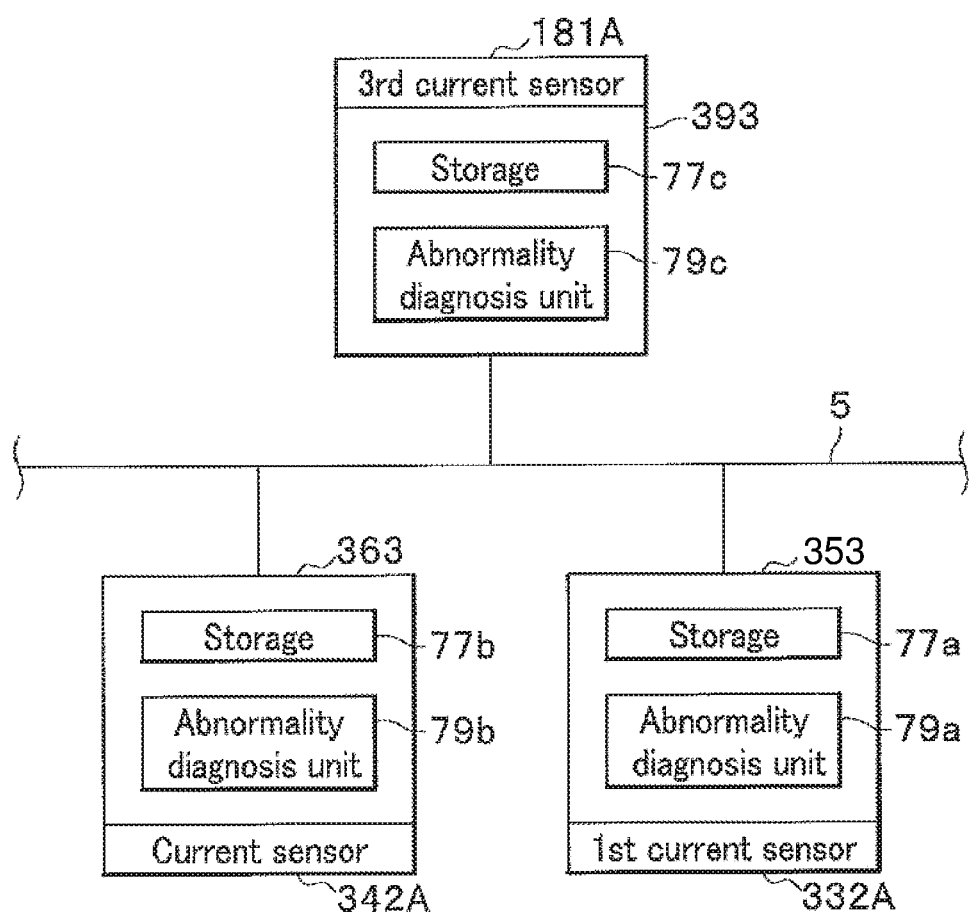
FIG. 1B is a block diagram showing an internal structure of first to third control devices that the vehicle steering device has.
Figure 3:
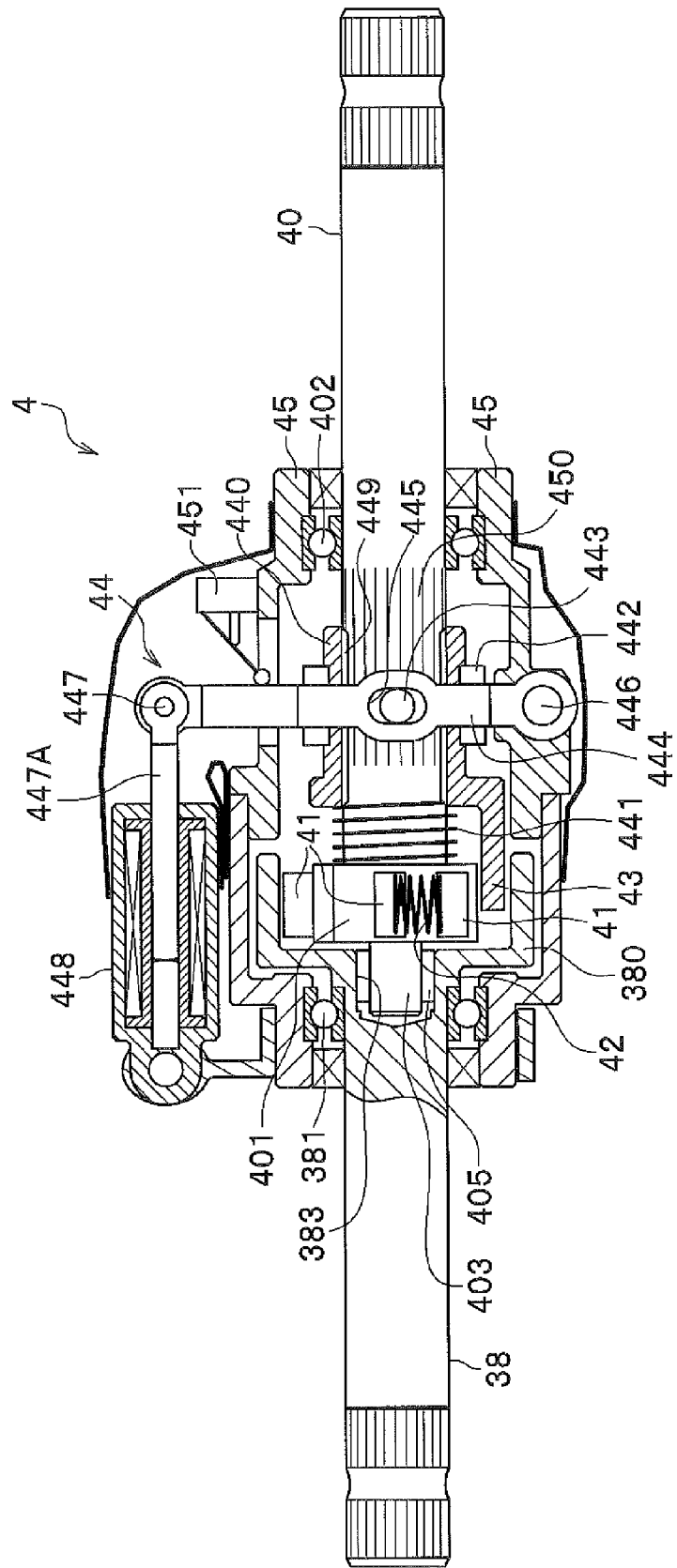
FIG. 3 is a vertical cross section showing a disconnection state of the connecting device.
Figure 4:
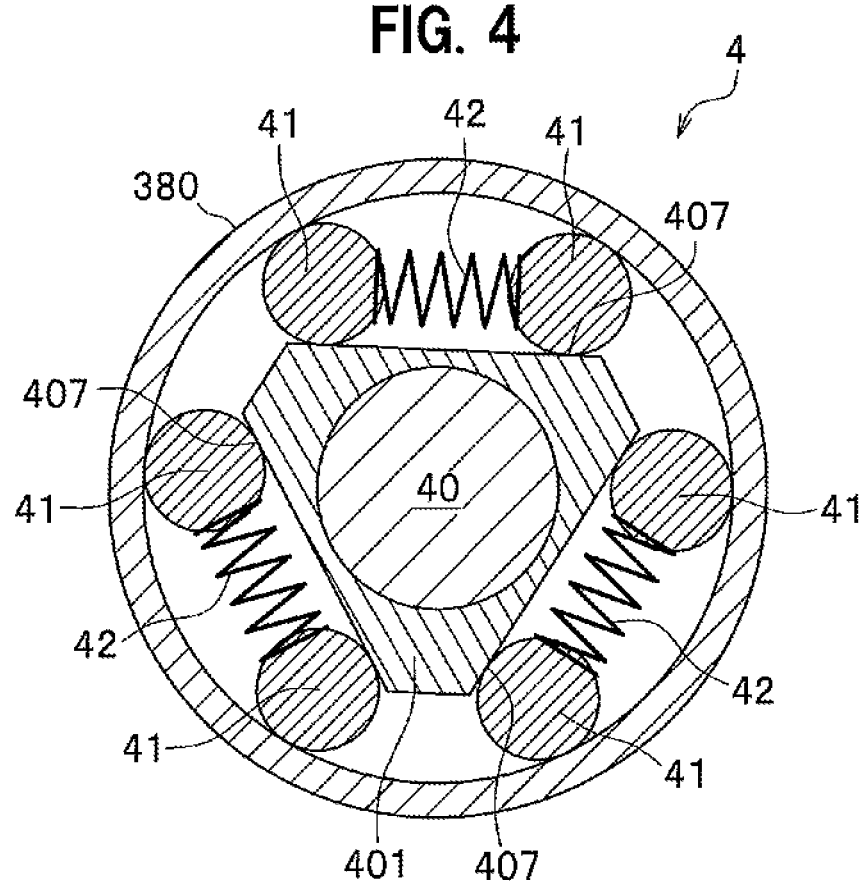
FIG. 4 is a cross section, taken along A-A line, showing a connection state of the connecting device.

FIG. 1A is a block diagram showing a general structure of a vehicle steering device 100 according to embodiments of the present invention. FIG. 1B is a block diagram showing an internal structure of first to third control devices that the vehicle steering device has. FIG. 2 is a cross section, taken along A-A line, showing a disconnection state of a connecting device (CD) 4. FIG. 3 is a vertical cross section showing a disconnection state of the connecting device 4. FIG. 4 is a cross section, taken along A-A line, showing a connection state of the connecting device 4.

Figure 5:
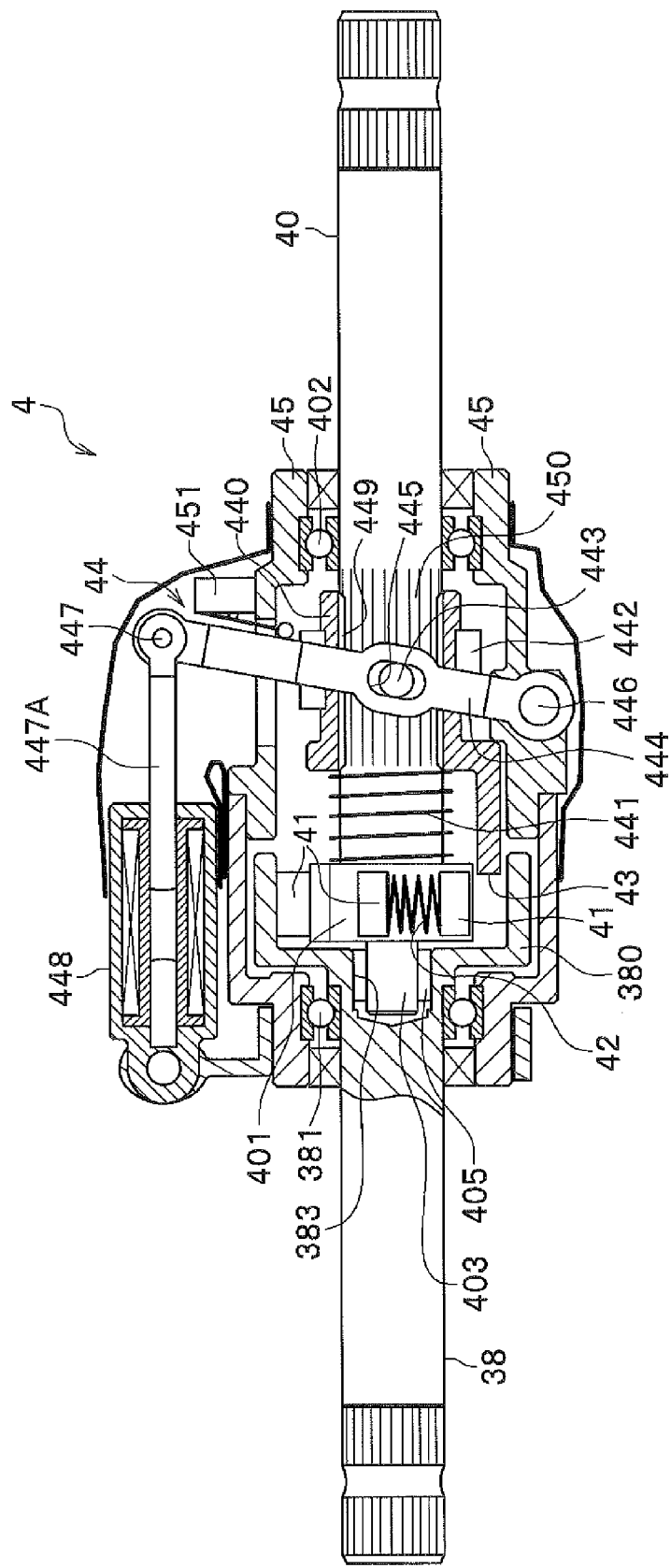
FIG. 5 is a vertical cross section showing a connection state of the connecting device.

FIG. 5 is a vertical cross section showing a connection state of the connecting device 4.

A vehicle steering device 101 includes, as shown in FIG. 1A, a steering wheel (steering wheel) 1, a reaction force application device 2, a steering device 3, the connecting device 4, a communication medium 5 such as CAN (Controller Area Network), a vehicle speed sensor 6 for detecting a speed of the vehicle (vehicle speed), a yaw rate sensor 7, a lateral acceleration sensor 8, and a rack position sensor 39.

The steering wheel 1 corresponding to "a steering member" according to the present invention is used when a traveling direction of a vehicle (not shown) is changed to a desired direction. Connected to a middle of the steering wheel 1 is a steering shaft 10.

The reaction force application device 2 has a function of applying a reaction force regarding a rotation direction of the steering shaft 10. The steering shaft 10 is connected to a rotation shaft 40 of the connecting device 4 (described later) through a first universal joint 11. The steering shaft 10 is rotationally supported by first to third bearings 13, 14, 15 disposed with an interval in a case 12. The case 12 is hermetically kept. The steering shaft 10 is equipped with a steering torque sensor 16, a steering angle sensor 17, and a reaction force generator 18.

The steering torque sensor 16 has a function of detecting a magnitude and direction of a steering torque inputted by the steering wheel 1 using, for example, solenoid type of coils 12a, 12b. Steering torque signals SA, SB detected as variation in magnetic permeability have characteristics with inverted relation each other (a value of adding the steering torque signals SA, SB is a constant). The steering torque signals SA, SB are applied to an interface circuit 164. The interface circuit 164 shapes waveforms of the steering torque signals SA, SB by an amplifying and filter process. The steering torque signals SA, SB after the waveform-shaping are applied to a first control device 353, a control device 363, and a control device 393 described later through the communication medium 5.

The first to third control devices 353, 363, 393 operate to obtain additional value of the steering torque signals SA, SB. Here, the additional value of the steering torque signals SA, SB has always a constant value when the steering torque sensor 16 is normal. This is because steering torque signals SA, SB detected by the steering torque sensor 16 have characteristics having an inverse relation. This means that an abnormality diagnosis of the steering torque sensor 16 can be performed on the basis of whether the additional value of the steering torque signals SA, SB has a constant value. Further, when one of the steering torque signals SA, SB rapidly varies, probability of an error is high due to a disconnection of a coil, an error in a circuit or an error in parts.

Accordingly, the first to third control devices 353, 363, 393 can make an abnormality diagnosis for the steering torque sensor 16 (including an abnormality diagnosis) depending on whether an error occurs such as a coil disconnection and an error in a component) by monitoring the additional value of the steering torque signals SA, SB or, time variation of signal values.

The steering angle sensor 17 has a function of detecting a steering angle and a direction inputted from the steering wheel 1 with, for example, a pair of rotation angle sensors (not shown) such as two potentiometers. Configuration of the steering angle sensor 17 is described in detail. The steering shaft 10 is provided with a small gear 174 which is rotationally disposed about the steering shaft 10. The small gear 174 is provided with a large gear 175e engageable to the small gears 174. A pair of the rotational angle sensors housed in a case 173 output rotation angle signals SC, SD (signals equivalent each other) regarding a reduced steering operation of the steering wheel 1 by detecting a rotation angle of a large gear 175. The rotation angle signals SC, SD are respectively applied to the first control device 353, the second control device 363, and the third control device 393.

The first to third control devices 353, 363, 393 have functions of abnormality diagnoses as to whether the steering angle sensor 17 is abnormal or not by monitoring a comparative result between the rotation angle signals SC, SD. The rotation angle signals SC, SD have characteristic which is common each other. This means that an abnormality diagnosis can be made depending on whether the steering angle sensor 17 is normal or not on the basis of whether the comparative results of the rotation angle signals SC, SD agree with each other.

Accordingly, the first to third control devices 353, 363, 393 can make the abnormality diagnosis as to whether the steering angle sensor 17 is abnormal or not by monitoring the comparative result between the rotation angle signals SC, SD.

The reaction force generator 18 has a function of generating a reaction force against the rotational direction of the steering shaft 10 of the steering wheel 1. The reaction force generator 18 includes a worm wheel 180, a worm wheel 182 engaging with the third worm wheel 180 provided at the rotation shaft of a third motor 181, and the third control device 393.

The control device 393 is provided with a third current sensor (third current detector) 181A. The third current value detected by the third current sensor 181A is supplied to the control device 363 and the control device 363 through the communication medium 5 by the control device 393.

The control device 393, which is described in detail later, has a function of generating a control signal for performing driving control for the first motor 332, a second motor 342, and a third motor 181 for application of steering reaction force, described later on the basis of the steering torque signals SA, SB from the steering torque sensor 16, the rotation angle signals SC, SC from the steering angle sensor 17. Further, the control device 393 is configured in which the function of generating a control signal for drive-control for the first motor 332 or the second motor 342.

The steering device 3 is configured including: a rack shaft 32 connected to a pair of steered wheels 30*a* and 30*b*; a first pinion gear 33 engaging with first rack teeth 320 installed in the rack shaft 32, a second pinion gear 34 engaging with second rack teeth 321 installed in the rack shaft 32, a second gear shaft 340 to which the second pinion gear 34 is attached, a driving device 35 for driving a first gear shaft 330, and a second drive device 36 for driving the second gear shaft 340.

The first gear shaft 330 is connected to a first rotation shaft 38, which is one part extending from the connecting device 4 through a universal joint 37. A second rotation shaft 40, which is the other part extending from a first universal joint connecting device 4, is connected to the steering shaft 10 through a first universal joint 11. Configuration of the connecting device 4 is described later in detail.

Provided between one side of the rack shaft 32 (the left on the sheet of the drawing) and a housing 378 covering structural members such as the rack shaft 32 is a pair of the rack position sensor 39 for detecting a position of the rack shaft 32 in the axial direction of the rack shaft 32. The rack position sensor 39 is configured including a pair of sensors (not shown) such as two potentiometers which are disposed in a case 390. The position detection signals of a pair of the rack position sensors 39 are directly transmitted to the control device 353 through the communication medium 5. Further, one of the position detection signals from a pair of the rack position sensors 39 may be transmitted to the first control device 353 and the first control device 363 through the communication medium 5 by the first control device 353. Further, the other of the position detection signals from a pair of the rack position sensors 39 may be transmitted to the first control device 353 and the first control device 363 through the communication medium 5 by the first control device 353. An opening of the housing 378 is hermetically sealed with a combination of the dust seals 381*a*, 381*b* and a oil seal 382.

The driving device 35 is configured including a first worm wheel 331 and a first worm (not shown) engaged with the first worm wheel 331. The first gear shaft 330 to which the first worm wheel 331 and the first pinion gear 33 are attached is rotationally supported through bearings 350, 351, 352 relative to the housing 378 at three points. The first worm is installed on the rotation shaft of the first motor 332. According to this, when the rotation shaft of the first motor 332 is driven, the first gear shaft 330 is rotationally driven through the first worm and the first worm wheel 331. As a result of the rotational driving the first pinion gear 33, the rack shaft 32 is driven in an axial direction.

The second drive device 36 is configured including a second worm wheel 341 and a second worm (not shown) engaged with the second worm wheel 341. The second worm wheel 341 and the second gear shaft 340 at which the second worm wheel 341 and the second pinion gear 34 are installed are rotationally supported relative to the housing 378 through bearings 360, 361, 362 at three points. The second worm is installed at a rotational shaft of the second motor 342. According to this configuration, when the rotation shaft of the second motor 342 is driven, the second gear shaft 340 is rotationally driven through the second worm and the second worm wheel 341. In response to this, as a result of rotationally drive of the second pinion gear 34, like the example of the driving device 35, the rack shaft 32 is operated to be driven in an axial direction.

The rack shaft 32, the first pinion gear 33, the second pinion gear 34, the driving device 35, and the second drive device 36 correspond to a steering force transmitting mechanism according to the present invention.

The first control device 353 is provided with a first current sensor (first current detecting unit) 332A for detecting a value of a current flowing through the first motor 332. The first current value detected by the first current sensor 332A is transmitted to the first control device 353 and the control device 393 through the communication medium 5 by the first control device 353.

The first control device 353 is configured including an interface circuit for outputting and inputting data, a computer for control operation, a watch dog timer circuit for diagnosis, and an FET bridge circuit (both not shown) for driving the first motor 332.

Further, the first control device 353 is connected to a power source 184 through a series circuit including a fuse (not shown) and a first parent relay 354, and the power source 184 through a series circuit. Further, the first control device 353 is connected to the first motor 332 through a first child relay 355.

Accordingly, the first control device 353 is configured to surely make cut off of the power supply to the first motor 332, the first control device 353, and the connecting device 4 by controlling release of the contacts of the first parent relay 354 and the first child relay 355 when, for example, an abnormality diagnosis for the first current sensor 332A is made.

Further, the first control device 353 (and the first control device 363, and the third control device 393) calculates a target position of the rack shaft 32 and performs feedback control so as to equalize the current position of the rack shaft 32 to a target position of the rack shaft 32.

During the feedback control, the first control device 353 (and the first control device 363, and the third control device 393) including an abnormality diagnosis according to the present invention, compares a second current value detected by a current sensor 342A, and determines whether a deviation of these first and second current values exceed a predetermined threshold value. When desired turning of the steered wheels 30*a*, 30*b* is normally performed, currents having balanced magnitudes flow through the first motor 332, and the second motor 342, respectively. This is because the first motor 332 and the second motor 342 are commonly set in their electric characteristic, that is, a reduction ratio and a process in the control unit are appropriately set to have the same electric characteristic within a normal operation range, and rotation shaft of the first motor 332 and the second motor 342 are connected each other through "the steering force transmitting mechanism".

Accordingly, the first control device 353 can perform the abnormality diagnosis rapidly for the first motor 332, the second motor 342, and their drive circuits (the first control device 353 and the second control device 363), etc. by only monitoring the deviation in the first current value and the second current value without a complicated diagnosis process and waiting time. Further, when an abnormality occurs in the rack position sensor 39 (either one of a pair of the rack position sensors 39 become troubled), an abnormality diagnosis for the rack position sensor 39 can be performed by monitoring a value of deviation in the first current value and a second current value without shifting the rack shaft 32. More specifically, the abnormality diagnosis can be performed rapidly without turning the steered wheel 30a.

Further, the first control device 363 and a third control device 394 are provided with abnormality diagnosis functions similar to those of the first current sensor 332A and the current sensor 342A included in the first control device 353.

When a diagnosis indicting at least one of the first current sensor 332A and the current sensor 342A is made, the first control device 353 performs control to cut off current supply to the connecting device 4. As a result of this, a pair of the first rotation shaft 38 and the second rotation shaft 40 extending from the connecting device 4 are mechanically connected each other, so that the steering shaft 10 is mechanically connected to the first rotation shaft 38.

Further, when the diagnosis indicating at least one of the first current sensor 332A or the current sensor 342A is an error, the first control device 353 cuts off electric supply to the connecting device 4 with a not-shown relay and connects the first rotation shaft 38 and the rotation shaft 40. At the same instance, the first control device 353 performs control to release contacts of the first parent relay 354 and the first child relay 355 to surely cut off the power supply to the first motor 332 and the first control device 353.

Like this operation, when a diagnosis indicating that at least one of the first current sensor 332A and the current sensor 342A is abnormal is made, the first control device 363 performs control to release the contacts of a second parent relay 364 and a child relay 365, and surely cuts off power supply to the second motor 342 and the first control device 363.

At the same instance as the described operation, the third control device 393 functioning as a part of the reaction force generator 18 in a normal state re-structures the steering function mode indicating a setting status of the steering function as an electric power steering function (Electric Power Steering: abbreviated as "EPS"), and performs (continues) an EPS assist control (see table 1).

Like the first control device 353, the first control device 363 is provided with the current sensor 342A (second current detection unit) for detecting a second current value of a current flowing through the second motor 342. The second current value detected by the current sensor 342A is transmitted to the first control device 353 and the third control device 393 through the communication medium 5.

The first control device 363 is configured including an interface circuit for input and output data, a computer for control operation, a watch-dog timer circuit for abnormality diagnosis and an FET bridge circuit (all not shown) for driving the second motor 342.

Further, the first control device 363 is connected to the power source 184 through a series circuit including a fuse (not shown) and the second parent relay 364. Further the first control device 363 is connected to the second motor 342 through the child relay 365. Accordingly, when the abnormality diagnosis is made because the deviations of the signals of the first current sensor 332A and the current sensor 342A exceeds the predetermined threshold value due to a trouble occurring in, for example, the second motor 342, the second control circuit 363 performs control to release the contacts of the second parent relay 364 and the child relay 365 operates to cut off the power supply to the second motor 342, the second control device 363, and the connecting device 4 with a not-shown relay and connects the first rotation shaft 38 and the second rotation shaft 40 of the first rotation shaft 38.

Further, the second control device 363 (the first control device 353, and the third control device 393) calculates a target position of the rack shaft 32 and performs feedback control to cause the current position of the rack shaft 32 detected by the rack position sensor 39 to agree with the target position of the rack shaft 32 calculated by calculation.

Upon the feedback control, the second control device 363 obtains by calculation the first current value detected by the first current sensor 332A and the current sensor 342A and determines whether a difference between the obtained first and second current values exceeds a predetermined threshold, or not. Here, when a necessary steering process is performed normally, currents having balanced magnitudes flow through the first motor 332 and the second motor 342. The reason is similar to the above description.

Accordingly, it can be understood that the second control device 363 can perform the abnormality diagnosis as to whether at least one of the signal from the first current sensor 332A and the signal from the current sensor 342A is abnormal or not on the basis of the determination result as to whether the difference between the first and second current value exceeds the threshold value.

Accordingly, the second control device 363 can perform the abnormality diagnosis as to whether at least one of the signal from the first current sensor 332A and the signal from the current sensor 342A is abnormal by monitoring the determination result as to whether the difference between the first and second current value exceed the threshold value.

When a diagnosis is made which indicates at least one of the signals from the first current sensor 332A and the signal from the current sensor 342A is abnormal, the second control device 363 performs cut out of the power supply to the connecting device 4 with a not-shown relay. As a result, a pair of the first rotation shaft 38 and the rotation shaft 40 extending from the connecting device 4 are connected, so that the steering shaft 10 is connected to the first rotation shaft 38.

Further, when the diagnosis has been made which indicates at least one of the signal from the first current sensor 332A and the signal from the current sensor 342A is abnormal, the second control device 363 performs control to release the contacts of the second parent relay 364 and the child relay 365, that is, operates to surely cut off the power supply to the second motor 342 and the second control device 363.

At the same time as the above description, when the diagnosis is made which indicates at least one of the signal from the first current sensor 332A and the signal from the current sensor 342A is abnormal, the first control device 353 performs control to release the contacts of the second parent relay 354 and the child relay 355, that is, operates to surely cut off the power supply to the first motor 332 and the first control device 353.

At the same instance as the described operation, the third control device 393 functioning as a part of the reaction force generator 18 in a normal state re-structures the steering function mode indicating a setting status of the steering function as a electric power steering function (Electric Power Steering: abbreviated as "EPS"), and performs (continues) an EPS assist control (see table 1).

Further, "⊚|" in Table 1 indicates a steering function mode (in this example, it is expressed as VGS1) set by re-construction of the steering system when a single one is failed, for example only the steering torque sensor 16 is failed. Further, "○" in Table 1 indicates a steering function mode (in this example, VGS) set by re-construction of the steering system when, for example, the third current sensor 181A or the yaw rate sensor 7 becomes failed after, for example, the steering torque sensor 16 is failed. Further, "x" in table l indicates steering function modes which cannot be set by re-construction of the steering system when any one of the various functions including the various types of the sensors 6, 7, 8, 16, 17, 39, 332A, 342A, 181A, or the first to third motors 332, 342, 181, the first to third control devices 353, 363, 393 is failed.

The third control device 393 mainly has a function of performing drive control for the third motor 181 on the basis of the vehicle speed signal of the vehicle speed sensor 6, the signal of the yaw rate sensor 7, the signal of the lateral acceleration sensor 8, the signal of the steering torque sensor 16, the signal of the steering angle sensor 17, the signal of the rack position sensor 39, etc. Further, the third control device 393 performs the abnormality diagnosis by comparing control signals generated by the first control devices 353, 363, 393 therebetween to specify the error diagnosis place, and a steering system is re-constructed without using the abnormal diagnosis place. Accordingly, as described later in detail, a necessary control is performed by selecting appropriate one of the steering function modes.

More specifically, the third control device 393 is configured including an interface circuit for outputting and inputting data, a computer for control operation, a watchdog timer circuit, and an FET bridge circuit for driving the third motor 181 (all of them are not shown).

The third control device 393 is connected to the power source 184 through a series circuit including a fuse (not shown) and a third parent relay 185. Further the third control device 393 is connected to the third motor 181 through a third child relay 186. Accordingly, for example, when diagnosis results indicating both the steering torque sensor 16 and the steering angle sensor 17 are abnormal, the third control device 393 performs control to release respect contacts of the third parent relay 185 and the third child relay 186 to surely cut off the power supply to the third control device 393 and the connecting device 4. In this case, the third control device 393 changes the steering function mode to a manual steering by connecting the first rotation shaft 38 to the rotation shaft 40 with the connecting device 4 to connect the steering shaft 10 to the first rotation shaft 38 to change the steering function mode to the manual steering.

In addition, when the third control device 393 is caused to function as a general controller for the whole of the steering system, the configuration including the third parent relay 185 and the third child relay 186 can be omitted.

Incidentally, for example, when an abnormal diagnosis result of the steering torque sensor 16 is made (see Table 1), the third control device 393 performs control to cause the third motor 181 to generate a steering reaction force in accordance with the steering and and steering direction on the basis of rotation angle signals SC, SD of the steering angle sensor 17. During this control, to alarm the driver to inform that an error occurs in the steering torque sensor 16, an alarm indication is made as well as a required steering torque is made larger (heavier) than that in the normal state.

The third control device 393 makes operation of a third target current value applied to the third motor 181 and performs feedback control to equalize the current third current value detected by the third current sensor 181A to the third target current value obtained by the operation.

When an abnormality occurs in the third current sensor 181A (see table 1), the third control device 393 changes the third target current value obtained by the operation to a terminal voltage signal of the third motor 181 and performs control using the voltage signal after change. During this control, to alarm the driver that an abnormality occurs in the third current sensor 181A, the third control device 393 makes an alarm indication and performs control to make the steering torque larger than that in the normal state.

In addition when an abnormality occurs in at least one of the third motor 181 and the third control device 393 (see Table 1), an alarm indication to alarm the driver to inform of occurrence of abnormality with reference to a steering angle and direction based on the rotation angle signals SC, SD of the steering angle sensor 17 and the current position of the rack shaft 32 detected by the rack position sensor 39. Further, the drive control of the first motor 332 and the second motor 342 is made using the first control device 353 and the second control device 363 to have a gear ratio larger than that in the normal steering operation (low responsibility). During the drive control, the third control device 393 surely cuts off the power supply to the third control device 393 by performing the control to release contacts of the third parent relay 185 and the third child relay 186.

The connecting device 4 has a function of switching between a connection state and a disconnection state between the first rotation shaft 38 connected to the steering device 3 side (see FIGS. 3 and 5) and the rotation shaft 40 (see FIGS. 2 to 5) connected to the reaction force application device 2 side. The first rotation shaft 38 is rotatably supported relative to a case 45 through a four-point-contact bearing 381 (double row angular bearings may be used) as shown in FIGS. 3 and 5. The rotation shaft 40 is rotationally supported by a rotation shaft case 45 through a bearing 402 and rotationally supported by the first rotation shaft 38 through a bearing 405.

The first rotation shaft 38 is provided with, on a side of the reaction force application device 2 thereof, a hollow part 383 having a substantially cylindrical hollow tube. On the other hand, the rotation shaft 40 is provided with, on a tip side directed to the steering device 3, a shaft part 403 having a substantially cylindrical hollow tube. The shaft part 403 of the second rotation shaft 40 is rotationally supported relative to the first rotation shaft 38 through the bearing 405 provided in the hollow part 383 of the first rotation shaft 38.

The connecting device 4 is configured including a hollow cylindrical member 380 provided at the side of the tip of the first rotation shaft 38, directed to the reaction force application device 2, a plurality of rollers 41 arranged at an interval around the rotation shaft 40, a plurality of spring members 42 provided between a plurality of the rollers 41, and a cam member 401 provided at an outer circumferential side of the rotation shaft 40.

The hollow cylindrical member 380 is configured opening toward a side of the reaction force application device 2 and a substantially hat shape in a lateral cross section. A part in the hat shape has an inner diameter larger than an outer diameter of the rotation shaft 40.

A plurality of the rollers 41 are arranged on an inner circumferential side of the hollow cylindrical member 380 and contact an outer circumferential side of the cam member 401. In the examples shown in FIGS. 2 and 4, a plurality of the rollers 41 are provided such that a pair of a rollers 41 (hereinafter, may be referred to as "pair rollers") are provided to have total three couples (six rollers). A plurality of the spring members 42 are each arranged between a pair of the rollers 41 so as to apply a force to a pair of the rollers 41 in such a direction that the rollers 41 are separated apart.

The cam member 401 is formed in a substantially triangle column provided by beveling peak portions to have three cam surfaces 407 which are orthogonal with a radiation direction of the rotation shaft 40. Pairs of the rollers 41 are provided to tightly contact three cam surfaces 407 of the cam member 401 in three directions, respectively.

The connecting device 4 includes a switching device 44 (see FIGS. 3 and 5) to provide a function of switching between a connected state and a disconnection state.

The switching device 44 has a function of mechanically control a coupling relation in a cuneiform between three combinations of the cam member 401 and three pairs of the rollers 41 and the hollow cylindrical member 380 by moving a switching claw unit 43 reciprocatingly along a shaft direction of the rotation shaft 40.

More specifically, the switching device 44 includes a slider portion 440 formed in a sleeve, which can move receiprocatively along a shaft direction on an outer circumferential portion of the rotation shaft 40, a spring member 441 applying a biasing force to the slider portion 440 in such a direction that the slider portion 440 is separated apart from the cam member 401, and a slider ring 442 formed in a circular ring rotationally supported on an outer circumferential portion of the slider portion 440. Further, the slider ring 442 is restricted in movement in a direction along an axial direction of the second rotation shaft 40.

For example, the slider portion 440 made of metal (not specifically limited) is provided with three switching claw units 43 spaced equidistantly in a circumferential direction integrally extending toward the side of the steering device 3.

The slider ring 442 is provided with a pair of pin members 443 integrally along a radial direction of the second rotation shaft 40 at a confronting position across the second rotation shaft 40.

Provided on an outer circumferential side of the slider ring 442 is a lever member 444 including a circular ring portion. The case 45 made of metal is provided with a fulcrum 446 of the lever member 444. On the other hand, a leverage of the lever member 444 is connected to the rod member 447A to have a link connection. A rod member 447 made of a magnetic material is provided to be inserted and pulled out relative to an electromagnet solenoid 448.

The circular ring portions of the lever member 444 have a pair of oblong hole extending in a direction orthogonal with a shaft direction of the second rotation shaft 40, respectively. A pair of the oblong holes 445 are provided with a pair of the pin members 443 coupled to the oblong holes 445, respectively. This provides such a configuration that rotating operation of the lever member 444 around the fulcrum 446 acts as a movement in a shaft direction of the second rotation shaft 40 in the slider ring 442 through a pair of the pin members 443 engaged with a pair of the oblong holes 445.

On an inner circumferential part of the slider portion 440, a plurality of splines 449 are formed extending in the axial direction of the second rotation shaft 40.

Also at the second rotation shaft 40 that an inner circumferential part of the slider portion 440 faces, a plurality of splines 450 extending in the axial direction like the description above are formed.

Accordingly, the slider portion 440 is slidably supported along the axial direction with an engaging state between the splines 449, 450 being maintained.

The switching device 44 configured as described above, operates as described below. More specifically, in a state where a coil of the electromagnet solenoid 448 is magnetized by supply of power, as shown in FIG. 3, the rod member 447A locates in an insertion direction relative to the coil of the electromagnet solenoid 448. At this instance, the lever member 444 rotates in a counter clockwise as the rod member 447A connected to the rod member 447A moves. Accordingly, the rotation of the lever member 444 in the counter clockwise direction on the fulcrum 446 is converted into movement in an axial direction of the slider portion 440 toward a side of the steering device 3 through a pair of the pin members 443 engaged with a pair of the oblong holes 445. As a result, the slider portion 440 shifts on the side of the steering device 3 against an elastically reaction force of the spring member 441. As the slider portion 440 shifts, a plurality of the switching claw units 43 are inserted into the hollow cylindrical member 380 to fill in gaps between three sets of the pair rollers 41 (see FIG. 2).

When a plurality of the switching claw units 43 are inserted into inside of the hollow cylindrical member 380, three pairs of the rollers 41 operate so as to be pushed by sides in a cuneiform of the switching claw units 43 in a circumferential direction. Accordingly, a plurality of the spring members 42 disposed between a plurality of the rollers 41 are in a compressed state. As a result, the outer circumferential portion and the inner circumferential part of the hollow cylindrical member 380 are separated apart, so that a disconnection state is maintained between the first rotation shaft 38 and the second rotation shaft 40. In this disconnection state, the first rotation shaft 38 and the second rotation shaft 40 are relatively rotatable each other.

On the other hand, when the coil of the electromagnet solenoid 448 is de-magnetized by stop of power supply to the coil of the electromagnet solenoid 448, as shown in FIG. 5, the rod member 447A locates in a pulled out direction relative to the coil of the electromagnet solenoid 448. At the instance, the lever member 444 rotates in clockwise with shift of the rod member 447 connected to the rod member 447A. Then the rotation of the lever member 444 on a leverage 446 is converted into movement in the axial direction of the slider portion 440 toward the steering device 3 through a pair of the pin member 443 engaging a pair of the oblong holes 445.

As a result, the slider portion 440 shifts on a side of the reaction force application device 2 when the slider portion 440 receives an elastic force of the spring member 441. As the slider portion 440 shifts, a plurality of the switching claw units 43 are pulled out from the inside of the hollow cylindrical member 380, so that three pairs of the rollers 41 are released from the pressure force by the three switching claw unit 43.

The electromagnet solenoid 448 is energized only when all the drive signals are ON (turn on) outputted by the first to third control devices 353, 363, 393 and not energized in other cases.

When the a plurality of the switching claw units 43 are pulled out from the inside of the hollow cylindrical member 380, a gap between each pair of the three pairs of the rollers 41 expands up to a set length of the spring member 42 by an elastic reaction force of a plurality of the spring members 42. Further, each of the three pairs of the rollers 41 tightly contacts three cam surfaces 407 of the cam member 401. As a result, an outer circumferential portion of the rollers 41 is engaged with an inner circumferential portion of the hollow cylindrical member 380 in a cuneiform manner.

Actually, for example, a plurality of parts such as the steering torque sensor 16, etc. are subject to abnormality diagnosis (multiple failures) and one EPS is selected as one of the operation function modes, a power supply to the connecting device 4 is stopped. This stops the power supply to the electromagnet solenoid 448. After that, the operation described above is performed, so that the engaging status is changed from the disconnection state to the connected state. With this switching, it is detected that the lever member 444 has actually rotated clockwise through a limit switch 451 (see FIGS. 3 and 5) and the first control devices 353, 363, 393 are informed of the detection.

At a start of the vehicle, the first control devices 353, 363, 393 perform normality diagnosis from the signal of the limit switch 451 which detects an event in which, for example, the switching claw unit 43 does not enter the inside of the hollow cylindrical member 380. Reconstruct of the steering system is performed as shown in table 1 in accordance of the abnormality diagnosis. For example, when the abnormality diagnosis is made which indicates that the switching claw unit 43 does not enter the hollow cylindrical member 380, the first control devices 353, 363, 393 set the steering function mode to the EPS mode to perform the steering control.

Incidentally, at a start up of the vehicle steering device 101 according to the embodiments, the switching claw unit 43 of the connecting device is in a connected state. More specifically, for example, while the vehicle is parked in which the switching claw units 43 of the connecting device are in the connection state, when an excessive load torque is applied to the connecting portions of the connecting device 4 (portions where three abut each other such as an inner circumferential portion of the hollow cylindrical member 380, outer circumferential portions of a plurality of pairs of the rollers 41, and portions of the cam surfaces 407) by steering the steering wheel 1 without driving, the connecting portions are in a fixed state in which the connecting portions bite each other. As a result, there may be a case where though the connecting device 4 is supplied with power, the connecting device 4 cannot be switched to disconnection state from the connection state because the switching device 44 cannot insert a plurality of the switching claw units 43 into the inside of the hollow cylindrical member 380.

To eliminate such a defect, the first to third control devices 353, 363, 393 are configured to be able to smoothly insert a plurality of the switching claw units 43 into the inside of the hollow cylindrical member 380 irrespective of the state of the connecting device 4. More specifically, the first to third control devices 353, 363, 393 control to drive at least one of the first motor 332 and the second motor 342 and the third motor 181 to release the connecting portions from the sticking state of the rollers 41 and the cam surfaces 407. This may be done by performing drive control to switch rotation directions of the first to third motors 332, 342, 181 in a vibration manner with appropriate cycles to lose the connecting portions.

[Operation of the Vehicle Steering Device 101 According to Embodiments of the Present Invention]

Next, an operation of the vehicle steering device 101 is described with reference to FIG. 6 and Table 1.

Figure 6:
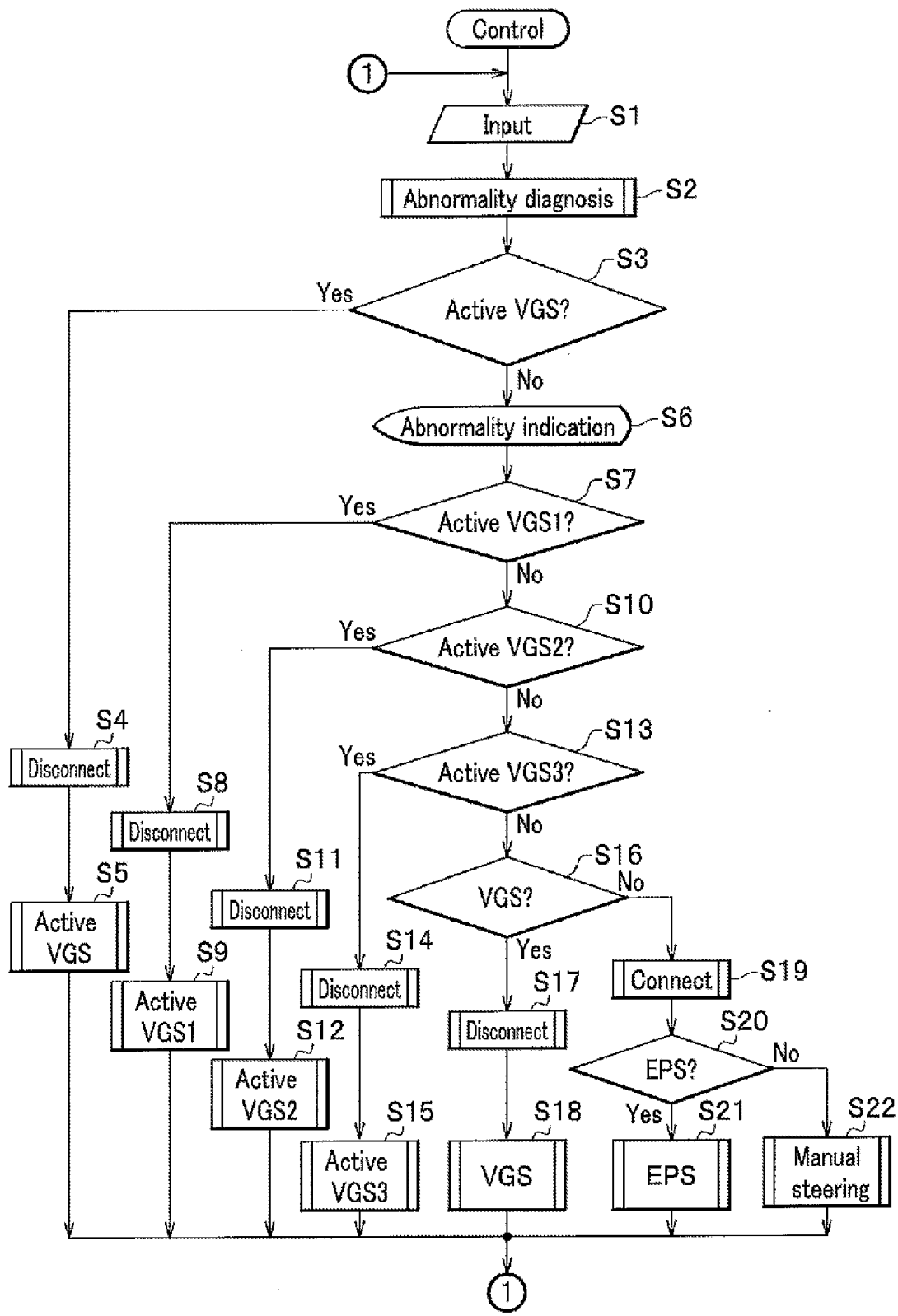
FIG. 6 is a flowchart for explaining an operation of the vehicle steering device according to embodiments of the present invention.

FIG. 6 is a flowchart showing an operation of the vehicle steering device 101.

Table 1 is a map (corresponding to "association data" of the present invention) in which types of appropriate steering function modes are associated with a part, having single or combined abnormal places, of various functional parts including the sensors 6, 7, 8, 16, 17, 39, 332A, 342A, 181A, the first to third motors 332, 342, 181, and the first to third control devices 353, 363, 393. This map (the same is true in the map described below) is stored in storages 77a, 77b, 77c (see FIG. 1B) included in the first to third control devices 353, 363, 393, respectively.

TABLE 1

|   | Abnormal place | Steering function mode | | | |
|---|---|---|---|---|---|
|   |   | SBW | | | |
|   |   | Active VGS | VGS | EPS | Manual steering |
| Sensor | Yaw rate sensor | X | ⊚ | ◯ | ◯ |
|   | Lateral acceleration sensor | X | ⊚ | ◯ | ◯ |
|   | Steering torque sensor | ⊚ VGS1 | ◯ | ◯ | ◯ |
|   | Steering angle sensor | X | X | ⊚ | ◯ |
|   | Rack position sensor | X | X | ⊚ | ◯ |
|   | 3rd current sensor | ⊚ VGS2 | ◯ | ◯ | ◯ |
|   | 1st current sensor | X | X | ⊚ | ◯ |
|   | 2nd current sensor | X | X | ⊚ | ◯ |
| Motor or ECU | 3rd motor or 3rd ECU | ⊚ VGS3 | ◯ | ◯ | ◯ |
|   | 1st motor or 1st ECU | X | X | ⊚ | ◯ |
|   | 2nd motor or 2nd ECU | X | X | ⊚ | ◯ |
| Connecting device |   | X | X | ⊚ | ◯ |
| Abnormality occurrence in 3rd motor or 3rd ECU in EPS mode |   | X | X | X | ⊚ |
| Others |   | X | X | X | ⊚ |

First, then an ignition key switch of the vehicle is turned on, power is supplied from a battery (not shown) on the vehicle to the first to third control devices 353, 363, 393, through fuses. With this, the first to third control devices 353, 363, 393 successively conduct the flow of process shown in FIG. 6.

In a step S1, the first to third control devices 353, 363, 393 receive signals through the communication medium 5 from various sensors, etc. including the vehicle speed sensor 6, the yaw rate sensor 7, the lateral acceleration sensor 8, the steering torque sensor 16, the steering angle sensor 17, the rack position sensor 39, and the first to third current sensors 332A, 342A, 181A.

In a step S2, the first to third control devices 353, 363, 393 performs the abnormality diagnosis. In the abnormality diagnosis process, the first to third control devices 353, 363, 393 perform diagnoses whether various functional portions are normal or not which include the various sensors 6, 7, 8, 16, 17, 39, 332A, 342A, and 181A in addition to functions of the first to third control devices 353, 363, 393.

Diagnosis processes are described more specifically in which abnormality diagnoses are divided into the sensors, etc. 6, 7, 8, 16, 17, 39, 332A, 342A, 181A, and the first to third motors 332, 342, 181.

First, in the diagnosis of the various sensors, etc. 6, 7, 8, 16, 17, 39, 332A, 342A, 181A the first to third control devices 353, 363, 393 compare a pair of detection signals from each of the various sensors, etc. which are multiplexed (duplicated), respectively. The abnormality diagnosis is made whether each of various sensors, etc. on the basis of whether these agree with each other (including a case where these converge to a predetermined allowable range).

When this is described with reference to the vehicle speed sensor 6, the first to third control devices 353, 363, 393 compare a pair of vehicle speed detection signals from the vehicle speed sensor 6 each other and make diagnosis as to whether the vehicle speed sensor 6 is normal based on whether these are agrees.

Further, for example, the abnormality diagnosis of the vehicle speed sensor 6 may be made by reading the signals of the engine speed from a system other than the vehicle steering device 101 (for example, PGM-FI: ProGraMmed Fuel Injection) through the communication medium 5 and comparing read signals.

Further, the first current sensor 332A is exemplified for description. The first to third control devices 353, 363, 393 compare a pair of the first current detection signals from the first current sensor 332A each other. The abnormality diagnosis is made whether the first current sensor 332A is abnormal or not on the basis of agreement of these signals. The first to third control devices 353, 363, 393 perform the same abnormality diagnosis for a pair of the second current detection signals, and a pair of the third current detection signals from the current sensor 342A and the similar abnormality diagnosis is made for a pair of the third current detection signals from the third current sensor 181A.

Further, the first to third control devices 353, 363, 393 may make an abnormality diagnosis indicating either of the first current sensor 332A or the current sensor 342A is abnormal. This is described in details. The following configuration may be adopted. The first to third control devices 353, 363, 393 compare the detection signal from the first current sensor 332A with detection signal from the current sensor 342A each other. The first to third control devices 353, 363, 393 make a diagnosis in which either one of the first current sensor 332A or the current sensor 342A is abnormal. According to this configuration, the system configuration can be simplified because the abnormality diagnosis can be made without multiplexing the first current sensors 332A, 342A.

In addition, abnormality diagnosis of the first to third motors 332, 342, 181 are provided by the following configurations:

For example, a diagnosis indicating the first motor 332 or the second motor 342 is abnormal is made on the basis of the abnormality diagnosis result based on comparison regarding two values. On the other hand, a diagnosis indicating the third motor 181 is made on the basis of the comparison result between the drive command current value for the third motor with the signal of the third current sensor 181A.

Further, in the abnormality diagnosis of the first to third control devices 353, 363, 393, the first to third control devices 353, 363, 393 each compare the results, i.e., three values, of the same processing contents regarding an input and an output which are common to specify a control device having a high probability in occurrence of abnormality. For example, when the results having common processing contents are the same among the three control devices (including cases where a variable converges within a predetermined allowable range, the same is true hereinafter), it is diagnosed that all of the first to third control devices 353, 363, 393 are correct in accordance with principle of majority rule.

Further, when the results of the common processing contents in two control devices are the same and the result of the remaining one is different from the two (including cases where a variable deviates from a predetermined allowable range, the same is true hereinafter), a diagnosis is made to indicates the two results are correct and the remaining one is incorrect in accordance with the principle of majority rule.

When the results of the common processing contents in three control devices are different from each other, a diagnosis is made to indicate all three control devices are incorrect.

The first to third control devices 353, 363, 393 select an operation function mode according to the diagnosis result with reference to the map (Table 1) on the basis of the diagnosis result as to whether all the sensors etc. or the functional portions in the step S2 is normal. In the map (Table 1), appropriate operation function modes suitable for the types of the abnormal place are described to have association thereto. For example, when all sensor, etc. and functional portions are normal, the first to third control devices 353, 363, 393 set the operation functional mode to (Active Variable Gear ratio Steering: hereinafter, referred to as "Active "VGS"). On the other hand, when one of the sensors, etc or the functional portions is abnormal, the first to third control devices 353, 363, 393 appropriately select one of the operation functional mode in accordance with the type of the abnormal place with reference to the map (Table 1).

In a step S3, in response to the diagnosis result whether all the sensors, etc or the functional portions are normal or not in the step S2, when all the sensors, etc. or the functional portions are normal (Yes), the first to third control devices 353, 363, 393 advance the flow of the process to the next step S4.

On the other hand, as a result of the step S3, when a determination is made not to set the operational function mode to the active VGS mode (No), i.e., when one or more out of the sensors, etc. and the functional portions are determined to be abnormal, the first to third control devices 353, 363, 393 make a jump in the flow of the processes to a step S6.

In the step S4, the first to third control devices 353, 363, 393 perform control to make the connecting device 4 in a disconnection state by supplying a power to the electromagnet solenoid 448 of the connecting device 4.

In a step S5, the first to third control devices 353, 363, 393 perform an active VGS control for setting the steering function mode to the active VGS mode (corresponding to "first operational function mode") to set the operation functional mode, and after that returns the flow of the process to the step S1. The active VGS control is described in detail later.

In the step S6, as a result of the determination in the step S3, when a determination is made indicting more than one of the sensors, etc, or the functional portions, the first to third control devices 353, 363, 393 are abnormal, an alarm lamp arranged on an instrument panel (not shown) of the vehicle is lighted and a control is made to indicate an abnormal place.

In steps S7 to S22, the first to third control devices 353, 363, 393 perform reconstruction of the steering system in accordance with the abnormality diagnosis result in the step S2, and set an appropriate steering function mode to perform the steering control.

First, in the step S7, the first to third control devices 353, 363, 393 determine whether the operational function mode to the active VGS1 mode with reference to the abnormality diagnosis result (indicating that the steering torque sensor 16 is abnormal), and the steering function mode map in table 1. As a result of the step S7, when a determination is made indicating that the operational mode is to be set to the active BGS1 mode (Yes), the first to third control devices 353, 363, 393 advance the flow of the process to the next step S8.

On the other hand, as a result of the determination in the step S7, when a determination is made indicating that the operational function mode is not to be set to the active VGS1 mode (No), the first to third control devices 353, 363, 393 make jump of the flow of the process to the step S10.

In the step S8, the first to third control devices 353, 363, 393 perform control to make the connecting device 4 in the disconnection state by continuing the power supply to the connecting device 4.

In the step S9, the first to third control devices 353, 363, 393 perform control of the active BGS1 to set the steering function mode to the active BGS1 mode (corresponding to "first steering function mode" of the present invention), and returns the flow of the process to the step S1. The active VGS1 control is described later.

In the step S10, the first to third control devices 353, 363, 393 determine whether the steering function mode is set to the active BGS2 mode or not with reference to the abnormality diagnosis result in the step S2 (indicting that the third current sensor 181A is abnormal). As a result of the determination in the step S10, when the steering function mode is set to the active VGS2 mode (Yes), the first to third control devices 353, 363, 393 (Yes), the first to third control devices 353, 363, 393 advance the flow of the processing to the next step S11.

On the other hand, as a result of the not to be set the active VGS2 mode (No), the first to third control devices 353, 363, 393 make a jump of the flow of process to the step S13.

In the step S11, the first to third control devices 353, 363, 393 perform control of the connecting device 4 to make the connecting device 4 in the disconnection state by continuing the power supply to the connecting device 4.

In the step S12, the first to third control devices 353, 363, 393 perform the active VGS2 control to set the steering function mode to the active VGS2 mode (corresponding to "first steering function mode") and return the flow of process to the step S1. An active VGS2 control is describe later.

In the step S13, the first to third control devices 353, 363, 393 determine whether the steering function mode is set to be the active VGS3 with reference to the abnormality diagnosis result (indicating that the third motor 181 or the third control device 393 (third ECU) is abnormal). As a result of the determination in the step S13, when the determination is that the steering function mode is to be set to the active VGS3 mode (Yes), the first to third control devices 353, 363, 393 advance the flow of the process to the next step S14.

On the other hand, as a result of a determination in the step S13, when the determination is that the steering function mode is not to be set to the active VGS3 mode (No), the first to third control devices 353, 363, 393 make a jump of the flow of process to the step S16.

In the step S14, the first to third control devices 353, 363, 393 perform control to make the connecting device 4 in the disconnection state by continuing the power supply to the connecting device 4.

In the step S15, the first to third control devices 353, 363, 393 perform the active VGS3 control to set the steering function mode to the active VGS3 mode (corresponding to the first steering functional mode of the present invention), and makes a jump of the flow of process to the step S1. The active BGS3 control is described in detail later.

In the step S16, the first to third control devices 353, 363, 393 determine whether the steering function mode to the VGS mode with reference to the abnormality diagnosis result (indicating that the yaw rate sensor 7 or the lateral acceleration sensor 8 is abnormal) in step S2. As a result of the determination in the step S16, when the determination is that the steering function mode is to be set to the VGS mode (Yes), the first to third control devices 353, 363, 393 advance the flow of process to next the step S17.

On the other hand, as a result of the determination of the step S16, the determination is that the steering function mode is not to be set to the VGS mode (No), the first to third control devices 353, 369, 393 make a jump of the flow of the process to the step S19.

In the step S17, the first to third control devices 353, 363, 393 perform control to make the connecting device 4 in a disconnection state.

In the step S18, the first to third control devices 353, 363, 393 perform the VGS control setting the steering function mode to the VGS mode (corresponding to "the second steering function mode" of the present invention), after this, returns the flow of the process to the step S1. The VGS control is described in detail later.

In the step S19, the first to third control devices 353, 363, 393 perform control to switch the connecting device 4 from the disconnection state to the connection state by cutting off the power supply to the electromagnet solenoid 448 of the connecting device 4.

In the step S20, the first to third control devices 353, 363, 393 determine whether the steering mode is set to the EPS mode or not with reference to the abnormality diagnosis result in the step S2 (indicating determination in the step S10, when the determination indicates that the steering functional mode is that either of the steering angle sensor 17 the rack position sensor 39, the first current sensor 332A, the current sensor 342A, the first motor 332, the first to third control device (first ECU) 353, the second motor 342, the second control device (second ECU) 363, or the connecting device 4 is abnormal). As a result of the determination in the step S20, when the determination is that the steering function mode is to be set to the EPS mode (Yes), a normal one of the first to third control devices 353, 363, 393 advances the flow of the process to the next step S21.

On the other hand, as a result of the determination in the step S20, when the determination has been made that the steering function mode is not set to the EPS mode, the first to third control devices 353, 363, 393 make a jump of the flow of the process to the step S22.

In the step S21, the normal one of the first to third control devices 353, 363, 393 performs the EPS control to set the steering function mode to an electric power steering (EPS) mode (corresponding to "third steering function mode"), and then returns the flow of the process to the step S1. The EPS control is described in detail later.

In the step S22, the first to third control devices 353, 363, 393 perform a manual steering control for setting the steering function mode to a manual steering mode (corresponding to "fourth steering function mode"). The manual steering control is described in detail later.

Figure 7:
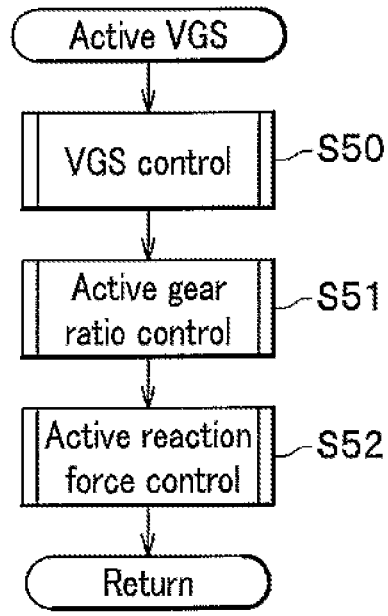
FIG. 7 is a flowchart showing a flow of process of a subroutine of Active VGS (Active Variable Gear ratio Steering).

Next the active VGS control in the step S5 is described with reference to FIG. 7. FIG. 7 is a flowchart showing a flow of a process in a subroutine program for the active VGS.

In a step S50, the first to third control devices 353, 363, 393, using the signals of the steering angle sensor 17, the rack position sensor 39, and the vehicle speed sensor 6, set a gear ratio between the steering angle based on the signal of the steering angle sensor 17 and a steered wheel turning angle based on the signal of the rack position sensor 39 to be changeable in accordance with the vehicle speed signal of the vehicle speed sensor 6 and performs drive control of the first and second motors 332, 342 to cause the current position of the rack shaft 32 to track the steered wheel turning angle providing the gear ratio set as described above. Such a drive control for the first and second motors 332, 342 is called "VGS control".

More specifically, in the VGS control in the step S50, the first to third control devices 353, 363, 393 read out the gear ratio (VGS ratio) according to the current vehicle speed with reference to the map in which an appropriate gear ratio is previously set in accordance with the variation in the vehicle speed and make a setting. Accordingly, the VGS ratio is set to, for example, a quick ratio having a value equal to or smaller than one at a slow vehicle speed range, on the other hand, a slow ratio having a value of one or more in a high vehicle speed range, i.e., a gear ratio which makes the steered wheel turning angle smaller than the actual steering angle.

The first to third control devices 353, 363, 393 perform the drive control for the first and second motors 332, 342 to cause the current position of the rack shaft 32 to track the position of the rack shaft 32 corresponding to the steed wheel turning angle providing the gear ratio (VGS ratio). Further, the gear ratio (VGS ratio) is appropriately set in consideration that the vehicle yaw rate agrees with a predetermined constant value, and that a lateral acceleration of the vehicle body does not exceed a predetermined limit value.

In drive control for the first and second motors 332, 342, the first and second current values of the current flowing through the first and second motors 332, 342 are determined mainly based on the load (friction coefficient) of road surface when the first and second motors 332, 342, the first and second control devices 353, 363, the first and second driving device 35, 36, etc. are normal.

On the other hand, when the first and second motors 332, 342, the first and second control devices 353, 363, etc are abnormal, more specifically, for example, when one phase of the first motor 332 is short-circuited, the current of the first motor 332 increases. Then the first to third control devices 353, 363, 393 respectively monitor such an event (current increase in the first motor 332) through the communication medium 5. The first and second current values monitored as described above are referred when the abnormality diagnosis is made for the first and second current sensors 332A, 342A and when the abnormality diagnosis for first and second control devices 353, 363 is made.

In a step S51, the first to third control devices 353, 363, 393 perform an active gear ratio control to actively control the gear ratio (VGS ratio) independently from the steering angle on the basis of the yaw rate based on the signal of the yaw rate sensor 7 an lateral acceleration of the vehicle body based on the signal of the lateral acceleration sensor 8 using the signals of the steering angle sensor 17, the rack position sensor 39, the yaw rate sensor 7, and the lateral acceleration sensor 8. This stabilizes a behavior of the vehicle.

More specifically, in the active gear ratio control in the step S51, the first to third control devices 353, 363, 393 read out a reference (target yaw rate and a reference (target) lateral acceleration to be set with reference to a map in which appropriate yaw rates and lateral accelerations are previously set in accordance with the variation of the steering angle and perform such a feedback control for the first and second motors 332, 342 that the yaw rate of the vehicle and the lateral acceleration of the vehicle body track set as describe above.

This contributes to a stable traveling of the vehicle by correcting disturbance factors which were not considered in the VGS control in the step S50 such as difference in a friction factor of traveling road surface (road of asphalt or pressed-snow), a roughness of the traveling road (rut), etc. Particularly, though the steered wheels 30a, 30b fit in ruts or the vehicle body receives lateral wind, as long as the driver keeps a direction of the steering wheel 1 in a straight direction, the first to third control devices 353, 363, 393 perform control to cause the vehicle to travel in the straight direction by automatically correcting the turning angles of the steered wheels 30a, 30b.

In summary, in the VGS control, the first to third control devices 353, 363, 393 perform the gear ratio control mechanically. In the active gear ratio control, the first to third control devices 353, 363, 393 perform control to appropriately change the turning angles of the steered wheels independently from the steering angle of the steering wheel 1 in which an automatic correction is precisely made against disturbance factors which is dealt as a command (Handle Command) reflecting steering intention from the steering wheel 1 by the driver.

In a step S52, the first to third control devices 353, 363, 393 set target steering torques so as to increase the steering torque (become heavy) with increases in the steering angle sensor detection signals, the yaw rate detection signal, and the lateral acceleration detection signal and increase the steering torque (become heavy) with increase in the vehicle speed with reference to signals of the steering torque sensor 16, the steering angle sensor 17, the vehicle speed sensor 6, the yaw rate sensor 7, and the lateral acceleration sensor 8 and a table (in which appropriate steering torque are previously set in accordance with each of signals of the steering torque sensor 16, the steering angle sensor 17, the vehicle speed sensor 6, the yaw rate sensor 7, and the lateral acceleration sensor 8) to perform feedback control so that a current steering torque based on the signal of the steering torque sensor 16 tracks the set target steering torque. Such a feedback control is called "active reaction control".

This increases a self-aligning torque to introduce the vehicle in a stable direction by applying an appropriate response during an operation of the steering wheel 1. The steered wheels 30a, 30b are returned as if the driver naturally makes steering toward the stable direction only by touching the steering wheel 1 with driver's hands. As a result, an operationablity of the steering wheel can be increased.

More specifically, in the active reaction force control in the step S52, the first to third control devices 353, 363, 393 set the response from the steering wheel 1 to be small in a low vehicle speed range, on the other hand, sets the response from the steering wheel 1 to be large at the high vehicle speed range by referring the vehicle speed signal of the vehicle speed sensor 6 and the map in which appropriate steering toques are previously set in accordance with the variation of the vehicle speed.

Accordingly, the operability of the steering wheel 1 can be increased with appropriate response from the steering wheel 1, which is set in accordance with the vehicle speed signal of the vehicle speed sensor 6 in addition to the steering angle of the steering wheel 1 or the yaw rate and lateral acceleration signal.

Further, when the vehicle is in an tendency toward spinning, a self-aligning torque increases because a detection signal of the yaw rate sensor 7 increases, so that the reaction force is controlled to be large, i.e., the response is controlled to be heavy, which makes it easier to operate the steering wheel 1 in such a direction as to stop the spin. In this manner, changing the response in an operation direction of the steering wheel 1 can prompt the driver to do an appropriate operation of the steering wheel 1. Further, this eliminates a torque steer based on vibrations from the traveling road surface, kickback at a difference in level and a difference in driving force between the steered wheels 30a, 30b (front driven wheels) because in general a mechanical coupling between the steering wheel 1 and the steered wheels 30a, 30b is not provided.

When the active reaction force control in the step S52 is completed, the first to third control devices 353, 363, 393 return the flow of process to the step S1 in FIG. 6 to perform the following process successively.

Next, the active VGS1 control in the step 9 is described with reference to FIG. 8.

Figure 8:
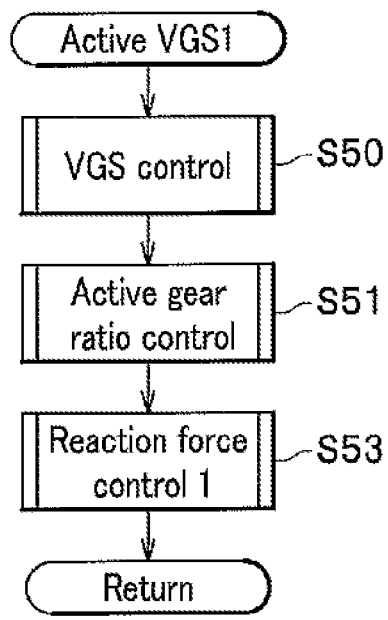
FIG. 8 is a flowchart showing a flow of process of a subroutine of Active VGS1 (Active Variable Gear ratio Steering 1)

FIG. 8 is a flowchart showing a flow of process in the subroutine program of the active VGS1.

In the active VGS control shown in FIG. 7 and the active VGS1 control shown in FIG. 8, there are common processing steps (S50 and S51). Accordingly, descriptions about the common processing steps (S50 and S51) are omitted, and a difference (in a step S53) therebetween is mainly described.

In the step S53, the first to third control devices 353, 363, 393, which have made an abnormality diagnosis indicating that an abnormality occurs in the steering torque sensor 16, set target steering torques so as to increase the steering torque (become heavy) with increases in the steering angle sensor detection signals, the yaw rate detection signal, and the lateral acceleration detection signal and increase the steering torque (become heavy) with increase in the vehicle speed with reference to the signal of the steering angle sensor 17, the vehicle speed sensor 6, a lateral accelerator yaw rate sensor 7, and the lateral acceleration sensor 8, and a steering torque setting table (a table in which appropriate steering torque is previously set so as to correspond to detection signals of the steering angle sensor 17, the vehicle speed sensor 6, the yaw rate sensor 7, and the lateral acceleration sensor 8) to control a voltage across terminals of the third motor 181 using a differential signal of the steering angle sensor 17 as a replacement information of the steering torque so that the current steering torque tracks the set target steering torque Such a control is called "Reaction force control 1".

This provides application of appropriate reaction during operation of the steering wheel 1, which can guide the vehicle in a stable direction.

The steered wheels 30*a*, 30*b* are returned (self aligning torque) as if the driver naturally steers in a stable direction by only touching the steering wheel 1. As a result, the self aligning torque of the vehicle can be increased and this provides application of appropriate reaction during operation of the steering wheel 1, which can guide the vehicle in a stable direction.

More specifically, in Reaction force control 1 performed in the step S53, the first to third control devices 353, 363, 393 sets the reaction by the steering wheel 1 to be small in the low vehicle speed range and to be large in the high vehicle speed range by referring the vehicle speed signal of the vehicle speed sensor 6 and the map in which the appropriate steering torque is set in accordance with the vehicle speed signal of the vehicle speed sensor 6.

Accordingly, the response by the vehicle steering device 1 is appropriately set in accordance with the steering angle of the steering wheel 1, the yaw rate, or the lateral acceleration and further referring the vehicle speed signal of the vehicle speed sensor 6. This improves the operability of the steering wheel 1.

Further, when the vehicle has a spin tendency, it is possible to prompt the driver to perform operation of the steering wheel 1 to such a direction that the spinning is stopped by changing the response in an operation direction of the steering wheel 1. Further, this eliminates kick back by the vibrations and a difference in level on the travelling road surface and deriving force difference between the steered wheels 30*a*, 30*b*.

However, in the reaction force control 1 in the step S53, the first to third control devices 353, 363, 393 can perform an alarm display informing an abnormality of the steering torque sensor 16 and perform a control to make the operation torque larger (heavier) than that at the normal state. This informs the driver at an appropriate timing of occurrence of an error in the steering system.

When the reaction force control 1 in the step S53 has been finished, the first to third control devices 353, 363, 393 returns the flow of the process to the step S1 in FIG. 6 and sequentially performs the following processes.

Figure 9:
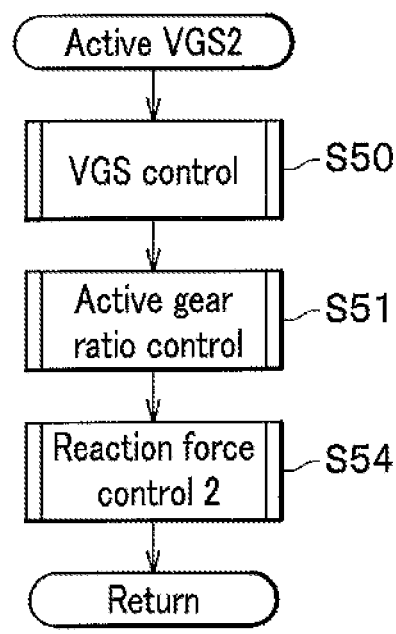
FIG. 9 is a flowchart showing a flow of process of a subroutine of Active VGS2 (Active Variable Gear ratio Steering 2.

Next, the active VGS2 in a step S12 is described with reference to FIG. 9. FIG. 9 is a flowchart showing a flow of a process in a subroutine of the active VGS2.

There are common processing steps (S50 and S51) between the active VGS2 shown in FIG. 7 and the active VGS control shown in FIG. 9. Accordingly, descriptions of the common processing steps (S50 and S51) are omitted and only a difference (a step S54) therebetween is mainly described.

In a step S54, the first to third control devices 353, 363, 393 having made an abnormality diagnosis indicating an abnormality occurs in the third current sensor 181A set a target steering torque so as to increase the steering torque (becomes heavy) with increases in the steering angle sensor detection signals, the yaw rate detection signal, and the lateral acceleration detection signal and increase the steering torque (become heavy) with increase in the vehicle speed and control a voltage across terminals of the third motor 181 using a differential signal of the steering angle sensor 17 so that the current steering torque tracks the set target steering torque as a target with reference to signals of the steering torque sensor 16, the steering angle sensor 17, the vehicle speed sensor 6, the yaw rate sensor 7, and the lateral acceleration sensor 8 and a table (in which appropriate steering torque are previously set corresponding to each of signals of the steering torque sensor 16, the steering angle sensor 17, the vehicle speed sensor 6, the yaw rate sensor 7, and the lateral acceleration sensor 8). Such a control is called "Reaction force control 2".

This provides application of appropriate reaction during operation of the steering wheel 1, which can guide the vehicle in a stable direction. The steered wheels 30*a*, 30*b* are returned (self aligning torque) as if the driver naturally steers in a stable direction by only touching the steering wheel 1. As a result, the self aligning torque of the vehicle can be increased and this provides application of appropriate reaction during operation of the steering wheel 1, which can guide the vehicle in a stable direction.

More specifically, in Reaction force 2 performed in the step S54, the first to third control devices 353, 363, 393 set the reaction by the steering wheel 1 to be small in the low vehicle speed range and to be large in the high vehicle speed range by referring the vehicle speed signal of the vehicle speed sensor 6 and the map in which the appropriate steering torque is set in accordance with the vehicle speed signal of the vehicle speed sensor 6.

Accordingly, the response by the vehicle steering device 1 is appropriately set in accordance with the steering angle of the steering wheel 1, the yaw rate, or the lateral acceleration and further referring the vehicle speed signal of the vehicle speed sensor 6. This improves the operability of the steering wheel 1.

Further, when the vehicle has a spin tendency, it is possible to prompt the driver to perform operation of the steering wheel 1 to such a direction that the spinning is stopped by changing the response in an operation direction of the steering wheel 1. Further, this eliminates kick back by the vibrations and a difference in level on the travelling road surface and driving force difference between the steered wheels 30*a*, 30*b*.

However, in the reaction force control 2 in the step S54, the first to third control devices 353, 363, 393 can perform an alarm display informing an abnormality of the third current sensor 181A and perform a control to make the operation torque larger (heavier) than that at the normal state. This informs the driver at an appropriate timing of occurrence of an error in the steering system.

When the reaction force control 2 in the step S54 has been finished, the first to third control devices 353, 363, 393 return the flow of the process to the step S1 in FIG. 6 and sequentially perform the following processes.

Next, the active VGS3 in a step S15 is described with reference to FIG. 10. FIG. 10 is a flowchart showing a flow of a process in a subroutine of the active VGS3.

Further, the active VGS3 (the step S15 in FIG. 6) is a process performed when a determination is made to set the operation function mode to the active VGS3 mode in a step S13 in FIG. 6 indicating that the third motor 181 or the third control device 393 is abnormal.

When the third motor 181 or the third control device (third ECU) 393 is abnormal, it is difficult for the first or second control device 353, 363 to appropriately control a response from the steering wheel 1. This is because the third motor 181 and the third control devices (third ECU) 393 mainly cover the role of applying the reaction force against the steering torque.

Under the above-describe circumstances, in a step S55, the first or second control devices 353, 363, having made an error diagnosis indicting the occurrence of an error at the third motor 181 or the third control device 353, 363, performs the VGS control 1 according to the VGS control in the step S50 shown in FIG. 7. More specifically, in the VGS control in the step S55, the first or second control device 353, or 363, using the signals of the steering angle sensor 17, the rack position sensor 39, and the vehicle speed sensor 6, set the above-described gear ratio (VGS ratio) to be variable so as to have a slower ratio than the example of the VGS control in the step S50 and perform the drive control of the first and second motors 332, 342 so that the current position of the rack shaft 32 tracks the steered wheel turning angle.

In the VGS control 1 in the step S55, a response of the steered wheel turning angle is lowered with respect to the steering quantity of the steering wheel 1 as compared with the example of the VGS control in the step S50. As a result, according to the VGS1 control in the step S55, through the third motor 181, or the third control device (third ECU) 393 is abnormal, the driver is allowed to control a total behavior of the vehicle slowly while the driver does not receive any specific strange feeling.

In a step S56, the first or second control device 353, 363, which has made abnormality diagnosis indicating the third motor 181 or the third control device (third ECU) 393 is abnormal, performs Active gear ratio control 1 which accords with the Active gear ratio control in the step S51 show in FIG. 7. More specifically, in the Active gear ratio control 1 in the step S56, the first or the second control devices 353, 363, using signals of the steering angle sensor 17, the rack position sensor 39, the yaw rate sensor 7, and the lateral acceleration sensor 8, controls the gear ratio (VGS ratio) actively to have a slower ratio than that in the example of the Active gear ratio control in the step S51 independently from the steering angle on the basis of the yaw rate based on the signal of the yaw rate sensor 7 and the lateral acceleration of the vehicle body based on the signal of the lateral acceleration sensor 8. This makes the behavior of the vehicle stable.

More specifically, in the Active gear ratio control 1 in the step S56, the first or second control device 353, 363, reads out a standard (target) yaw rate and the standard (target) lateral acceleration through referring the steering angle based on the signal of the steering angle sensor 17 and the map in which appropriate yaw rate and the lateral acceleration according to variation of the steering angle are previously set. In this setting, in the Active gear ratio control 1 in the step S56, the standard (target) values are set to be smaller (mild) than those in the example of the Active gear ratio control in the step S51. The first and second control devices 353, 363 perform feedback control for the first and second motors 332, 342 so that the yaw rate of the vehicle and the lateral acceleration of the vehicle body track the standard (target) values which have been set to be smaller (mild).

This makes a response of the steered wheel turning angle with respect to the operation quantity of the steering wheel 1 smaller than that in the example of the Active gear ration control in the step S51. As a result, according to the Active gear ratio control 1 in the step S56, the behavior of the vehicle can be generally stabilized without giving a specific strange feeling to the driver though the third motor 181 or the third control device (third ECU) 393 is abnormal.

In a step S57, the first or second control devices 353, 363, having made an abnormality diagnosis indicting the occurrence of an error at the third motor 181 or the third control devices 353, 363, perform the VGS control 3 according to the VGS control in the step S50 shown in FIG. 7. More specifically, in the Reaction force control 3 in the step S57, the first or second control device 353, 363 cuts off the power supply to the third motor 181 and the third control device 393 by performing control to open the respective contacts of the third parent relay 185 and the third child relay 186.

When the Reaction force control 3 in the step S57 has finished, the first or second control device 353, 363 return the flow of the process to the step S1 in FIG. 6 to successively perform the following process.

Figure 11:
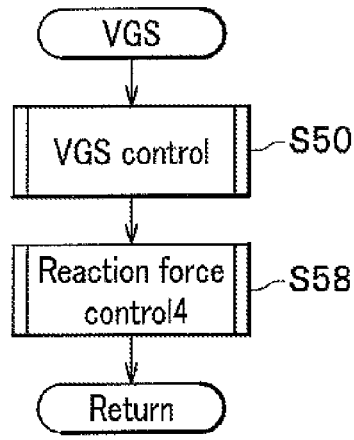
FIG. 11 is a flowchart showing a flow of process of a subroutine of Active VGS (Active Variable Gear ratio Steering).

Next, the VGS control in the step S18 is described with reference to FIG. 11. FIG. 11 is a flowchart indicating a flow of the process in a subroutine of the VGS.

In the Active VGS control shown in FIG. 7 and the VGS control shown in FIG. 11, there are common steps (S50). Accordingly, the description about the common processing step (S50) is omitted and the process in a step S58 which only the VGS control shown in FIG. 11 is described.

Further, the VGS (the step S18 in FIG. 6) is a process executed when it is determined to set the steering function mode to the VGS mode in the step S18 in FIG. 6 because the yaw rate sensor 7 or the lateral acceleration sensor 8 is abnormal.

The first to third control devices 353, 363, 393, having made an error diagnosis indicting the occurrence of an abnormality at the yaw rate sensor 7 or the lateral acceleration sensor 8, performs Reaction force control 4 similar to a reaction force generally performed in electric power steering (EPS) in the step S58. More specifically, in the Reaction force control 4 in the step S58, the first to third control devices 353, 363, 393 set target current values for the first to third control devices 353, 363, 393 in accordance with the current steering torque with reference to the steering torque based on the signal of the steering torque sensor 16 and the map in which an appropriate target current is previously set in accordance with variation in the steering torque so that the detection value of the first to third current sensors 332A, 342A, 181A track the target current values which have been set as described to perform drive controls of the first to third motors 332, 342, 181.

This lowers the load on the driver of the steering torque on the steering wheel 1. Further, in the Reaction force control 4 in the step S58, the first to third control devices 353, 363, 393 perform an alarm indicating that the yaw rate sensor 7 or the lateral acceleration sensor 8 is abnormal and control making the steering torque larger (heavier) than that in the normal state. This alarms the driver at suitable timing indicating that abnormality occurs in the steering system.

When the Reaction force control 4 has completed, the first to third control devices 353, 363, 393 return the flow of process to the step S1 in FIG. 6, and successively execute the following process.

Figure 12:
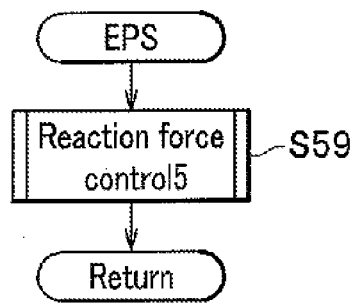
FIG. 12 is a flowchart showing a flow of process of a subroutine of EPS (Active Variable Gear ratio Steering).

Next, the EPS control in the step S21 is described with reference to FIG. 12. FIG. 12 is a flowchart showing a flow of process in a subroutine of EPS.

The EPS (the step S21 in FIG. 6) is a process executed when any one of the steering angle sensor 17, the rack position sensor 39, the current sensor 342A, the current sensor 342A, the first motor 332, the first control device (first ECU) 353, the second motor 342, the second control device (second ECU) 363, and a clutch (not shown) is abnormal in a case where a determination is made in the step S21 in FIG. 6, the determination indicating that the steering function mode is set to the EPS mode.

In a step S59, the first to third control devices 353, 363, 393, having made the determination that any one of the steering angle sensor 17, the rack position sensor 39, the current sensor 342A, the current sensor 342A, the first motor 332, the first control device (first ECU) 353, the second motor 342, the second control device (second ECU) 363, and the clutch is abnormal, perform Reaction force control 5 generally performed in the electric power steering (EPS).

More specifically, in the Reaction force control 5 in the step S59, when the first to third control devices 353, 363, 393 have made the abnormality diagnosis of, for example, the connecting device 4 on the basis of the issuing state of command signal for causing the connecting device 4 to enter the connection state (for example, when the signal of the limit switch 451 is OFF (see FIG. 3) though the command signal is issued for causing the connecting device 4 to enter the connection state), the first to third control devices 353, 363, 393 perform the Reaction force control 4 in the step S58.

Further, when an abnormality diagnosis is made, the abnormality diagnosis indicating that an abnormality occurs in any one of the first motor 332, the first control device (first ECU) 353, the second motor 342, and the second control device (second ECU) 363, the third control device 393 sets the target current value of the third motor 181 in accordance with the current steering torque with reference to the steering torque based on the signal of the steering torque sensor 16 and the map in which an appropriate target current is previously set in accordance with the variation of the steering torque, and the third control device 393 performs the drive control of the third motor 181 so that the detection value of the third current sensor 181A tracks the target current value set as mentioned above.

This reduces the load on the driver regarding the steering torque of the steering wheel 1. However, the Response force control 5 in the step S59, the third control device 393 makes an alarm indication informing an abnormal place and performs control making the steering torque heavier than that in the normal state. This informs the driver of occurrence of the abnormality in the steering system at suitable timing.

When the Reaction force control 4 has completed, the third control device 393 returns the flow of the process to the step S1 to successively execute the flowing process.

Figure 13:
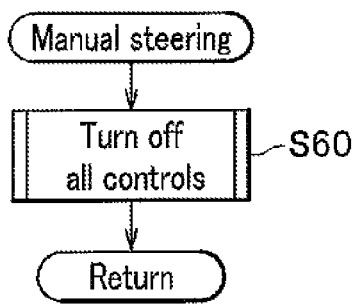
FIG. 13 is a flowchart showing a flow of process of a subroutine of manual steering (Manual Steering).

Next, a Manual steering control in the step S22 is described with reference to FIG. 13. FIG. 13 is a flowchart showing a flow of process of a subroutine of the Manual steering (Manual Steering).

Further, the Manual steering (the step S22 in FIG. 6) is a process when the steering function mode is the EPS mode shown in FIG. 12, an abnormality occurs in any one of the third motor 181 and the third control device (third ECU) 393, and a determination is made to set the steering function mode to the Manual steering mode in the step S22 in FIG. 6.

In the step S59, when the steering function mode is the EPS mode, the first or second control device 353, 363, having made the abnormal diagnosis indicting an abnormality occurs in any one of the third motor 181 or the third control device (third ECU) 393, cut off the power supply to the first motor 332 and the first control device 353, the second motor 342 and the second controller 363, the third motor 181 and the third control device 393, and the connecting device 4 by making the contacts of the first parent relay 354 and the child relay 355, and the second parent relay 364 and the second child relay 365, and the third parent relay 185 and the third child relay 186 off and turns off the control functions of the first to third control devices 353, 363, 393. This returns the steering mode to the Manual steering mode.

[Advantageous Effect of the Vehicle Steering Device 101 According to the Embodiment of the Present Invention]

Next, an advantageous effect of the vehicle steering device 101 according to the embodiment of the present invention is described.

In the vehicle steering device 101 according to the embodiment of the present invention, abnormality diagnosis units 79a, 79b, 79c (see FIG. 1B) included in the first to third control devices 353, 363, 393 make a diagnosis indicating that the steering device 3 is abnormal when the deviations of the first and second current values detected by the first and second current sensors 332A, 342A, respectively, exceed a predetermined threshold value.

Here, when the turning operation of the steered wheels 30a, 30b is normally performed, currents having equivalent values flow through the first and second motor 332, 342. This is because electrical characteristics of the first and second motors 332, 342 are commonly set and coupled with each other through the "steering force transmitting mechanism".

Accordingly, the abnormality diagnosis units 79a, 79b, 79c of the first to third control devices 353, 363, 393 can make the abnormality diagnosis of the steering device 3 only by monitoring deviations of the first and second current values without any waiting time due to complicated operation processes and diagnosis process.

Accordingly, the vehicle steering device 101 according to the embodiment of the present invention can make the abnormality diagnosis rapidly even though, for example, abnormal signals occurs in the first and the second current detecting units due to, for example the steering motor, etc fail.

Further, the abnormality diagnosis units 79a, 79b, 79c make the abnormality diagnosis on the basis of the first and second current values directly detected by the first and second current sensors 332A, 342A. This provides a diagnosis of occurrence of abnormality before the failed motor starts abnormal rotation during the abnormality diagnosis, which previously suppresses an abnormal behavior of the vehicle, which may be caused by the abnormal rotation of the failed motor. This is described with an sample where, for example, three-phase motors are used as the first motor 332 and the second motor 342 for turning the wheels, one phase of the three-phase motor is short-circuited and a large current flows. In this failed example, the current detection signal of the motor having an abnormality largely exceeds a determination threshold, so that an abnormal diagnosis can be made instantaneously.

Further, the first motor 332 and the second motor 342 have been set to have electrical characteristics which are common to each other. Accordingly, a magnitude of an output of a normal motor is equivalent to output of the motor having an abnormality. Thus, it does not occur that the steered wheels 30*a*, 30*b* are turned up to an abnormal status in which an output of the abnormal motor overcomes a magnitude of the output of the normal motor.

Further, even when abnormality (stop) occurs at one of the first motors 332, 342, the steering function by the other motor can be maintained.

Further, if it is assumed that abnormality (reverse rotation) occurs in one of the first and second motors 332, 342, the abnormality (reverse rotation) can be cancelled out by the other motor. As a result, it is expected that the turning function can be maintained to a feasible extent.

Further, according to the vehicle steering device 101 of the present embodiment, because the first and second motors 332, 342 for turning the wheel having setting in electrical characteristic which are common each other are connected with each other through the turning force transmission mechanism, so that the output characteristics of each motor can be suppressed to a lower level than the case where the turning drive with a single motor. Accordingly, for example, it is possible to provide operation with power supply from the existing 12-voltage capacity battery without any boosting circuit for supplying a new 24-voltage or 48-voltage capacity circuit in response to the second supply with a from the JP government. As a result, a size of each motor can be made to have a smaller sized, which provides a degree of freedom in layout.

Further, in the vehicle steering device 101 according to the embodiment of the present invention, the abnormality diagnosis units 79*a*, 79*b*, 79*c* perform an abnormality diagnosis according to principle of majority rule. More specifically, the abnormality diagnosis units 79*a*, 79*b*, 79*c* of the first to third control devices 353, 363, 393 compare three processing results of the common processes of obtained through executing common process among the first to third control devices 353, 363, 393. On the basis of the comparison result, when more than one processing results belong within a predetermined allowable range, a diagnosis is made to indicate that the control unit corresponding to the more than one processing results. On the other hand, when a diagnosis is made to indicate that the control unit corresponding to the processing result outside the processing result of the more than one processing result, an abnormal diagnosis is made.

Here, the common processes executed by the first to third control devices 353, 363, 393, respectively, mean, for example, processes of which input values and operation contents are common. When all of the first to third control devices 353, 363, 393 are normal and the common processing is made in parallel, it can be expected that all three processing results have values which are common among them. Further, if in a case where processing results of two of the first to third control devices 353, 363, 393, 353, which are a majority, are the same, and the processing result of the remaining control unit is different from the processing results of the two control unit, the two control units have a higher probability in that the control unit is/are normal state than the remaining control unit.

According to the vehicle steering device 101 of the embodiment of the present invention, the abnormality diagnosis of the first to third control devices 353, 363, 393 can be made appropriately at a suitable timing.

Further, when configuration is made to continue the control operation of the control unit of which diagnosis is made to be normal, this contributes to maintain the steering function to a feasible extent.

Further, in the vehicle steering device 101 according to the embodiment of the present invention, in response to the abnormality diagnosis by the abnormality diagnosis units which the first to third control devices 353, 363, 393 have, the switching device 44 in the connecting device 4 switches the switching claw unit 43 from the disconnection state to the connection state, the rollers 41 couple to gaps between the hollow cylindrical member 380 in a cuneiform because the spring members 42 are released from pressing forces from the switching claw unit 43. This provides mechanical connection between the first rotation shaft 38 and the second rotation shaft 40, so that the manual steering is configured.

According to the vehicle steering device 101 of the embodiment of the present invention, the steering function is surely maintained because when the abnormality diagnosis units 79*a*, 79*b*, 79*c* of the first to third control devices 353, 363, 393 perform the abnormality diagnosis, the manual steering is rapidly configured by mechanically connecting the first rotation shaft 38 and the second rotation shaft 40*by* the operation of the switching device 44 of the connecting device 4.

Further, in the vehicle steering device 101 according to the embodiment of the present invention, the first to third control devices 353, 363, 393 perform cutoff of the power supply to the switching device 44 of the connecting device 4 in response to the abnormality diagnosis of the abnormality diagnosis units 79*a*, 79*b*, 79*c* to switch the switching claw unit 43 from the disconnection state to the connection state.

According to the vehicle steering device 101 of the embodiment of the present invention, the steering function can be surely maintained using the preferable embodiment in view of fail safe.

Incidentally, the switching claw unit 43 of the connecting device 4 is in the connection state at a start-up of the vehicle steering device 101 (start-up of the vehicle) according to the embodiment of the present invention. More specifically, for example, when an excessive load torque is applied to the connection part of the connecting device 4 because the steering wheel (steering member) 1 is rotated during parking where the switching claw unit 43 of the connecting device 4 is in the connection state, a sticking state occurs at the connection parts (a part where three parts abut each other, the three parts including hollow cylindrical member 380, the cam member 401, and the rollers 41) stick on each other. As a result, though the switching device 44 of the connecting device 4 is caused to operate, there may be a case where the connecting device 4 cannot be switched from the connection state to the disconnection state.

Accordingly, in the vehicle steering device 101 of the embodiment of the present invention, when the first to third control devices 353, 363, 393 switch the switching claw unit 43 from the connection set to the disconnection state, a control is made to drive at least one of the first motor 332, the second motor 342, and the third motor 181.

According to the vehicle steering device 101 of the embodiment of the present invention, though the connecting parts are in fixed state where the connecting parts are stuck, the connecting parts can be surely and rapidly loosened. As a result, the original steering function can be surely displayed.

Further, in the vehicle steering device 101 according to the embodiment of the present invention, the first to third control devices 353, 363, 393 set the steering function mode to either of the first steering function mode (Active VGS), the second steering function mode (VGS), the third steering function mode (EPS), or the fourth steering function mode (manual steering) with reference to the abnormality place of the abnormality diagnosis by the abnormality diagnosis unit 79a, 79b, 79c and the map describing types of appropriate steering function modes corresponding to a plurality of abnormal places.

In the vehicle steering device 101 according to the embodiment of the present invention, shifting stages to the manual steering which is a final countermeasure when the abnormality occurs in the steering system (connection between the first rotation shaft 38 and the second rotation shaft 40) are four stages, and re-structure of the steering system using the remaining function at respective stages is made to suppress the frequency of switching to the manual steering which is the final measure.

[Other Embodiments]

The embodiments described above show an example to realize the present invention. Accordingly, it should be avoided to interpret the technical scope of the present invention in a restrictive manner. This is because the present invention can be embodied in various modes without departure of the subject matter and main characteristics of the present invention.

For example, in the embodiments of the present invention, description is made with example configuration in which the first to third control device 353 mainly performs drive control of the first motor 332, the second control device 363 mainly performs drive control of the second motor 342, and the third control device 393 mainly performs drive control of the third motor 181.

In place of the above-described configuration, another configuration may be adopted in which, for example, when an abnormality occurs in the first control device 353, the second control device 363 mainly performs the drive control of the first motor 332 in addition to the second motor 342. Further, still another configuration may be adopted in which, for example, when an abnormality occurs in the first to third control device 353, the third control device 363 mainly performs the drive control of the first motor 332 in addition to the third motor 181. Further, another configuration may be adopted in which, for example, when abnormalities occur in the first and second control devices 353, 363, the third control device 393 mainly performs the drive controls of the first and second motors 332, 342 in addition to the first and second motors 332, 342.

In summary, another configuration may be adopted in which the first to third control devices 353, 363, 393 perform drive control of the first to third motors 332, 342, 181 through complementary cooperation.

With such a configuration, if abnormality occurs in one or two of the first to third control devices 353, 363, 393, the drive control of the first to third motors 332, 342, 181 with the remaining control device. Accordingly, sound steering function can be maintained to a feasible extent with the remaining units.

DESCRIPTION OF REFERENCE SYMBOLS

1 steering wheel (steering member)
2 reaction force application device
3 steering device
4 connecting device
30a, 30b steered wheel
38 first rotation shaft
40 second rotation shaft
41 pair rollers
42 spring members
43 switching claw unit
44 switching device
101 vehicle steering device
181 third motor
181A third current sensor
332 first motor
332A first current sensor (first current detecting unit)
342 second motor
342A current sensor (second current detecting unit)
353 first control device (ECU1)
363 second control device (ECU2)
380 hollow cylindrical member
393 third control device (ECU 393)
401 cam member

The invention claimed is:

1. A vehicle steering device comprising:
a steering device configured to turn a steered wheel in accordance with operation of a steering member, the steering device including first and second motors for steering which are connected to each other through a steering force transmitting mechanism and have electric characteristics which are set commonly for the motors;
a first current detecting unit configured to directly detect a first current value of a current flowing through the first motor;
a second current detecting unit configured to directly detect a second current value of a current flowing through the second motor;
an abnormality diagnosis unit configured to make a diagnosis indicating that the steering device is abnormal when a difference between the first and second current values detected by the first and second current detecting units exceeds a predetermined threshold value;
a reaction force application device, including a third motor, configured to apply a reaction force in response to operation of the steering member; and
a connecting device, disposed between the steering device and the reaction force application device and configured to switch a mechanical connection between a first rotation shaft on a side of the steering device and a second rotation shaft on a side of the reaction force applying device to either of a disconnection state or a connection state,
wherein the connecting device comprises:
a hollow cylindrical member provided at either one of the first rotation shaft or the second rotation shaft;
a cam member, disposed at the other, different from the one, of the first and second rotation shafts, which can be housed in the hollow cylindrical member;
a plurality of pairs of rollers in a gap between the hollow cylindrical member and the cam member;
a plurality of spring members, which are disposed between the rollers of each of the pairs of the rollers, respectively, each of which applies a biasing force to the associated pair of the rollers in such a direction that the rollers of the pair are separated;
a switching claw unit provided insertably and removably to and from a gap between the hollow cylindrical member and the cam member;
a switching device which switches the switching claw unit to either of a disconnection state in which the switching claw unit is inserted into the gap or a connecting state in which the switching claw unit is removed from the gap; wherein, when the switching device switches the switching claw unit from the disconnection state to the connecting state in response to an abnormality diagnosis, a plurality of the spring members are released from a pressure force by the switching claw unit, which causes the plurality of pairs of rollers to engage with the gap between the hollow cylindrical member and the cam member in a cuneiform manner, which mechanically connects the first and second rotation shafts to mechanically connect the steering member and the steered wheel.

2. A vehicle steering device comprising:

a steering device configured to turn a steered wheel in accordance with operation of a steering member, the steering device including first and second motors for steering which are connected to each other through a steering force transmitting mechanism and have electric characteristics which are set commonly for the motors;

a first current detecting unit configured to directly detect a first current value of a current flowing through the first motor;

a second current detecting unit configured to directly detect a second current value of a current flowing through the second motor;

an abnormality diagnosis unit configured to make a diagnosis indicating that the steering device is abnormal when a difference between the first and second current values detected by the first and second current detecting units exceeds a predetermined threshold value;

a reaction force application device, including a third motor, configured to apply a reaction force in response to operation of the steering member;

a first control unit configured to mainly perform drive control of the first motor;

a second control unit configured to mainly perform drive control of the second motor; and a third control unit configured to mainly perform drive control of the third motor, wherein the first to third control units include the abnormality diagnosis unit and include functions executing common processes; wherein the abnormality diagnosis unit compares three processing results obtained by executing the common processes by the first to third control units, respectively, and wherein;

based on a result of the comparison, when more than one of the three processing results belong to a predetermined allowable range, the abnormality diagnosis unit makes a diagnosis to indicate that the control units corresponding to the more than one of the processing results are normal and a diagnosis to indicate that the control unit corresponding to the processing result outside the processing results of the more than one of the processing results is abnormal.

3. The vehicle steering device as claimed in claim 1, wherein the first to third control units switch the switching claw unit from the disconnection state to the connection state by performing control to cut off the power supply to the switching device of the connecting device in response to the abnormality diagnosis by the abnormality diagnosis unit.

4. The vehicle steering device as claimed in claim 2, further comprising:

a connecting device, disposed between the steering device and the reaction force application device and configured to switch a mechanical connection between a first rotation shaft on a side of the steering device and a second rotation shaft on a side of the reaction force applying device to either of a disconnection state or a connection state, wherein the connecting device comprises:

a hollow cylindrical member provided at either one of the first rotation shaft or the second rotation shaft;

a cam member, disposed at the other, different from the one, of the first and second rotation shafts, which can be housed in the hollow cylindrical member;

a plurality of pairs of rollers in a gap between the hollow cylindrical member and the cam member;

a plurality of spring members, which are disposed between the rollers of each of the pairs of the rollers, respectively, each of which applies a biasing force to the associated pair of the rollers in such a direction that the rollers of the pair are separated;

a switching claw unit provided insertably and removably to and from a gap between the hollow cylindrical member and the cam member;

a switching device which switches the switching claw unit to either of a disconnection state in which the switching claw unit is inserted into the gap or a connecting state in which the switching claw unit is removed from the gap; wherein when the switching device switches the switching claw unit from the disconnection state to the connecting state in response to an abnormality diagnosis, a plurality of the spring members are released from a pressure force by the switching claw unit, which causes the plurality of pairs of rollers to engage with the gap between the hollow cylindrical member and the cam member in a cuneiform manner, which mechanically connects the first and second rotation shafts to mechanically connect the steering member and the steered wheel, and the first to third control units perform driving of at least one of the first motor, the second motor, and the third motor when the first to third control units cause the switching claw unit to switch from the disconnection state to the connecting state.

5. The vehicle steering device as claimed in claim 2, wherein the first to third control units further include a storage storing association information designating appropriate steering function modes associated with different abnormality diagnoses that the abnormality diagnosis unit may make, respectively, and wherein the first to third control units perform control to set one of the appropriate steering function modes associated with an abnormality diagnosis by the abnormality diagnosis unit among a first steering function mode (active variable gear ratio steering; active VGS), a second steering function mode (variable gear ratio steering: VGS), a third steering function mode (electric power steering: EPS), and a fourth steering function mode (manual steering), with reference to at least one component of the vehicle steering device associated with the abnormality diagnosis by the abnormality diagnosis unit and the association information.

* * * * *